(12) United States Patent
Rommel

(10) Patent No.: US 11,175,245 B1
(45) Date of Patent: Nov. 16, 2021

(54) SCATTER X-RAY IMAGING WITH ADAPTIVE SCANNING BEAM INTENSITY

(71) Applicant: American Science and Engineering, Inc., Billerica, MA (US)

(72) Inventor: Martin Rommel, Lexington, MA (US)

(73) Assignee: American Science and Engineering, Inc., Billerica, MA (US)

( * ) Notice: Subject to any disclaimer, the term of this patent is extended or adjusted under 35 U.S.C. 154(b) by 0 days.

(21) Appl. No.: 16/901,371

(22) Filed: Jun. 15, 2020

(51) Int. Cl.
*G01N 23/203* (2006.01)
*G01N 23/20008* (2018.01)

(52) U.S. Cl.
CPC ..... *G01N 23/203* (2013.01); *G01N 23/20008* (2013.01); *G01N 2223/053* (2013.01); *G01N 2223/20* (2013.01); *G01N 2223/33* (2013.01); *G01N 2223/40* (2013.01); *G01N 2223/505* (2013.01)

(58) Field of Classification Search
None
See application file for complete search history.

(56) References Cited

U.S. PATENT DOCUMENTS

| | | | |
|---|---|---|---|
| 2,831,123 A | 4/1958 | Daly | |
| 2,972,430 A | 2/1961 | Johnson | |
| 3,766,387 A | 10/1973 | Heffan | |
| 3,780,291 A | 12/1973 | Stein | |
| 3,784,837 A | 1/1974 | Holmstrom | |
| 3,961,186 A | 6/1976 | Leunbach | |
| 3,971,948 A | 7/1976 | Pfeiler | |
| 4,031,401 A | 6/1977 | Jacob | |
| 4,045,672 A | 8/1977 | Watanabe | |
| 4,047,035 A | 9/1977 | Dennhoven | |

(Continued)

FOREIGN PATENT DOCUMENTS

| | | |
|---|---|---|
| CN | 1493176 A | 4/2004 |
| CN | 1745296 A | 3/2006 |

(Continued)

OTHER PUBLICATIONS

International Search Report for PCT/US20/37716, dated Sep. 9, 2020.

(Continued)

*Primary Examiner* — Hoon K Song
(74) *Attorney, Agent, or Firm* — Novel IP

(57) ABSTRACT

This specification describes an X-ray scanning system that adaptively generates a scatter signal, in the course of a single scan, based on the detected brightness areas of a scanned object. An X-ray source is configured to emit an X-ray beam towards an area over a target object. At least one detector detects radiation scattered from the target object and generates a corresponding scatter radiation signal. The scatter radiation signal is characterized, at least in part, by one or more brightness levels corresponding to one or more scanned areas of the target object. A feedback controller receives the scatter radiation signal from the detector, generates a signal that is a function of the one or more brightness levels and that is based on the received scatter radiation signal, and transmits the signal to the X-ray source. In response, the X-ray source is configured to receive the signal and adjust the X-ray beam intensity based on the signal.

25 Claims, 8 Drawing Sheets

(56) References Cited

U.S. PATENT DOCUMENTS

| | | | |
|---|---|---|---|
| 4,064,440 A | 12/1977 | Roder |
| 4,101,776 A | 7/1978 | Mansfield |
| 4,139,771 A | 2/1979 | Dennhoven |
| 4,180,737 A | 12/1979 | Kingsley |
| 4,210,811 A | 7/1980 | Dennhoven |
| 4,216,499 A | 8/1980 | Dennhoven |
| 4,242,583 A | 12/1980 | Annis |
| 4,259,582 A | 3/1981 | Albert |
| 4,260,898 A | 4/1981 | Annis |
| 4,267,446 A | 5/1981 | Brown |
| 4,315,146 A | 2/1982 | Rudin |
| 4,342,914 A | 8/1982 | Bjorkholm |
| 4,366,382 A | 12/1982 | Kotowski |
| 4,380,817 A | 4/1983 | Harding |
| 4,420,182 A | 12/1983 | Kaneshiro |
| 4,430,568 A | 2/1984 | Yoshida |
| 4,472,822 A | 9/1984 | Swift |
| 4,494,001 A | 1/1985 | Peck |
| 4,497,062 A | 1/1985 | Mistretta |
| 4,503,332 A | 3/1985 | Annis |
| 4,511,799 A | 4/1985 | Bjorkholm |
| 4,525,854 A | 6/1985 | Molbert |
| 4,566,113 A | 1/1986 | Doenges |
| 4,599,740 A | 7/1986 | Cable |
| 4,620,099 A | 10/1986 | Schoenig |
| 4,641,330 A | 2/1987 | Herwig |
| 4,646,339 A | 2/1987 | Rice |
| 4,692,937 A | 9/1987 | Sashin |
| 4,736,401 A | 4/1988 | Donges |
| 4,788,436 A | 11/1988 | Koechner |
| 4,788,704 A | 11/1988 | Donges |
| 4,799,247 A | 1/1989 | Annis |
| 4,809,312 A | 2/1989 | Annis |
| 4,825,454 A | 4/1989 | Annis |
| 4,839,913 A | 6/1989 | Annis |
| 4,864,142 A | 9/1989 | Gomberg |
| 4,870,670 A | 9/1989 | Geus |
| 4,884,289 A | 11/1989 | Glockmann |
| 4,979,202 A | 12/1990 | Siczek |
| 4,991,189 A | 2/1991 | Boomgaarden |
| 5,022,062 A | 6/1991 | Annis |
| 5,056,129 A | 10/1991 | Steinmeyer |
| 5,065,418 A | 11/1991 | Bermbach |
| 5,068,883 A | 11/1991 | DeHaan |
| 5,077,771 A | 12/1991 | Skillicorn |
| 5,091,924 A | 2/1992 | Bermbach |
| 5,098,640 A | 3/1992 | Gozani |
| 5,103,099 A | 4/1992 | Bourdinaud |
| 5,179,581 A | 1/1993 | Annis |
| 5,181,234 A | 1/1993 | Smith |
| 5,182,764 A | 1/1993 | Peschmann |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis |
| 5,281,820 A | 1/1994 | Groh |
| 5,302,817 A | 4/1994 | Yokota |
| 5,313,511 A | 5/1994 | Annis |
| 5,319,547 A | 6/1994 | Krug |
| 5,343,046 A | 8/1994 | Smith |
| 5,367,552 A | 11/1994 | Peschmann |
| 5,376,795 A | 12/1994 | Hasegawa |
| 5,379,334 A | 1/1995 | Zimmer |
| 5,391,878 A | 2/1995 | Petroff |
| 5,394,454 A | 2/1995 | Harding |
| 5,420,959 A | 5/1995 | Walker |
| 5,430,787 A | 7/1995 | Norton |
| 5,446,288 A | 8/1995 | Tumer |
| 5,493,596 A | 2/1996 | Annis |
| 5,524,133 A | 6/1996 | Neale |
| 5,548,123 A | 8/1996 | Perez-Mendez |
| 5,550,380 A | 8/1996 | Sugawara |
| 5,600,144 A | 2/1997 | Worstell |
| 5,600,303 A | 2/1997 | Husseiny |
| 5,617,462 A | 4/1997 | Spratt |
| 5,629,515 A | 5/1997 | Maekawa |
| 5,629,523 A | 5/1997 | Ngo |
| 5,638,420 A | 6/1997 | Armistead |
| 5,642,393 A | 6/1997 | Krug |
| 5,642,394 A | 6/1997 | Rothschild |
| 5,665,969 A | 9/1997 | Beusch |
| 5,666,393 A | 9/1997 | Annis |
| 5,687,210 A | 11/1997 | Maitrejean |
| 5,692,028 A | 11/1997 | Geus |
| 5,692,029 A | 11/1997 | Husseiny |
| 5,696,806 A | 12/1997 | Grodzins |
| 5,734,166 A | 3/1998 | Czirr |
| 5,751,837 A | 5/1998 | Watanabe |
| 5,763,886 A | 6/1998 | Schulte |
| 5,764,683 A | 6/1998 | Swift |
| 5,768,334 A | 6/1998 | Maitrejean |
| 5,783,829 A | 7/1998 | Sealock |
| 5,784,507 A | 7/1998 | Holm-Kennedy |
| 5,787,145 A | 7/1998 | Geus |
| 5,805,660 A | 9/1998 | Perion |
| 5,838,759 A | 11/1998 | Armistead |
| 5,903,623 A | 5/1999 | Swift |
| 5,910,973 A | 6/1999 | Grodzins |
| 5,930,326 A | 7/1999 | Rothschild |
| 5,936,240 A | 8/1999 | Dudar |
| 5,940,468 A | 8/1999 | Huang |
| 5,968,425 A | 10/1999 | Bross |
| 5,974,111 A | 10/1999 | Krug |
| 6,018,562 A | 1/2000 | Willson |
| 6,031,890 A | 2/2000 | Bermbach |
| 6,058,158 A | 5/2000 | Eiler |
| 6,067,344 A | 5/2000 | Grodzins |
| 6,078,052 A | 6/2000 | DiFilippo |
| 6,081,580 A | 6/2000 | Grodzins |
| 6,094,472 A | 7/2000 | Smith |
| 6,151,381 A | 11/2000 | Grodzins |
| 6,188,747 B1 | 2/2001 | Geus |
| 6,192,101 B1 | 2/2001 | Grodzins |
| 6,192,104 B1 | 2/2001 | Adams |
| 6,195,413 B1 | 2/2001 | Geus |
| 6,198,795 B1 | 3/2001 | Naumann |
| 6,203,846 B1 | 3/2001 | Ellingson |
| 6,212,251 B1 | 4/2001 | Tomura |
| 6,218,943 B1 | 4/2001 | Ellenbogen |
| 6,236,709 B1 | 5/2001 | Perry |
| 6,249,567 B1 | 6/2001 | Rothschild |
| 6,252,929 B1 | 6/2001 | Swift |
| 6,256,369 B1 | 7/2001 | Lai |
| 6,278,115 B1 | 8/2001 | Annis |
| 6,282,260 B1 | 8/2001 | Grodzins |
| 6,292,533 B1 | 9/2001 | Swift |
| 6,301,326 B2 | 10/2001 | Bjorkholm |
| 6,320,933 B1 | 11/2001 | Grodzins |
| 6,333,502 B1 | 12/2001 | Sumita |
| 6,356,620 B1 | 3/2002 | Rothschild |
| 6,421,420 B1 | 7/2002 | Grodzins |
| 6,424,695 B1 | 7/2002 | Grodzins |
| 6,434,219 B1 | 8/2002 | Rothschild |
| 6,435,715 B1 | 8/2002 | Betz |
| 6,442,233 B1 | 8/2002 | Grodzins |
| 6,445,765 B1 | 9/2002 | Frank |
| 6,453,003 B1 | 9/2002 | Springer |
| 6,453,007 B2 | 9/2002 | Adams |
| 6,456,684 B1 | 9/2002 | Mun |
| 6,459,761 B1 | 10/2002 | Grodzins |
| 6,459,764 B1 | 10/2002 | Chalmers |
| 6,473,487 B1 | 10/2002 | Le |
| RE37,899 E | 11/2002 | Grodzins |
| 6,483,894 B2 | 11/2002 | Hartick |
| 6,507,025 B1 | 1/2003 | Verbinski |
| 6,532,276 B1 | 3/2003 | Hartick |
| 6,542,574 B2 | 4/2003 | Grodzins |
| 6,542,578 B2 | 4/2003 | Ries |
| 6,542,580 B1 | 4/2003 | Carver |
| 6,543,599 B2 | 4/2003 | Jasinetzky |
| 6,546,072 B1 | 4/2003 | Chalmers |
| 6,552,346 B2 | 4/2003 | Verbinski |
| 6,556,653 B2 | 4/2003 | Hussein |
| 6,563,903 B2 | 5/2003 | Kang |

(56) References Cited

U.S. PATENT DOCUMENTS

| | | |
|---|---|---|
| 6,567,496 B1 | 5/2003 | Sychev |
| 6,580,778 B2 | 6/2003 | Meder |
| 6,584,170 B2 | 6/2003 | Aust |
| 6,597,760 B2 | 7/2003 | Beneke |
| 6,606,516 B2 | 8/2003 | Levine |
| 6,621,888 B2 | 9/2003 | Grodzins |
| 6,636,581 B2 | 10/2003 | Sorenson |
| 6,637,266 B1 | 10/2003 | Froom |
| 6,653,588 B1 | 11/2003 | Gillard-Hickman |
| 6,658,087 B2 | 12/2003 | Chalmers |
| 6,663,280 B2 | 12/2003 | Doenges |
| 6,665,373 B1 | 12/2003 | Kotowski |
| 6,665,433 B2 | 12/2003 | Roder |
| 6,687,326 B1 | 2/2004 | Bechwati |
| 6,747,705 B2 | 6/2004 | Peters |
| 6,763,635 B1 | 7/2004 | Lowman |
| 6,785,357 B2 | 8/2004 | Bernardi |
| 6,812,426 B1 | 11/2004 | Kotowski |
| 6,816,571 B2 | 11/2004 | Bijjani |
| 6,837,422 B1 | 1/2005 | Meder |
| 6,839,403 B1 | 1/2005 | Kotowski |
| 6,843,599 B2 | 1/2005 | Le |
| 6,859,607 B2 | 2/2005 | Sugihara |
| 6,876,719 B2 | 4/2005 | Ozaki |
| 6,879,657 B2 | 4/2005 | Hoffman |
| 6,909,770 B2 | 6/2005 | Schramm |
| 6,920,197 B2 | 7/2005 | Kang |
| 6,965,662 B2 | 11/2005 | Eppler |
| 7,010,094 B2 | 3/2006 | Grodzins |
| 7,039,159 B2 | 5/2006 | Muenchau |
| 7,067,079 B2 | 6/2006 | Bross |
| 7,072,440 B2 | 7/2006 | Mario |
| 7,099,434 B2 | 8/2006 | Adams |
| 7,103,137 B2 | 9/2006 | Seppi |
| 7,110,493 B1 | 9/2006 | Kotowski |
| 7,115,875 B1 | 10/2006 | Worstell |
| RE39,396 E | 11/2006 | Swift |
| 7,162,005 B2 | 1/2007 | Bjorkholm |
| 7,203,276 B2 | 4/2007 | Arsenault |
| 7,207,713 B2 | 4/2007 | Lowman |
| 7,215,737 B2 | 5/2007 | Li |
| 7,217,929 B2 | 5/2007 | Hirai |
| 7,218,704 B1 | 5/2007 | Adams |
| 7,253,727 B2 | 8/2007 | Jenkins |
| 7,308,076 B2 | 12/2007 | Studer |
| 7,322,745 B2 | 1/2008 | Agrawal |
| 7,326,933 B2 | 2/2008 | Katagiri |
| 7,333,587 B2 | 2/2008 | De |
| 7,366,282 B2 | 4/2008 | Peschmann |
| 7,369,463 B1 | 5/2008 | Van Dullemen |
| 7,369,643 B2 | 5/2008 | Kotowski |
| 7,379,530 B2 | 5/2008 | Hoff |
| 7,400,701 B1 | 7/2008 | Cason |
| 7,409,042 B2 | 8/2008 | Bertozzi |
| 7,417,440 B2 | 8/2008 | Peschmann |
| 7,486,768 B2 | 2/2009 | Allman |
| 7,505,556 B2 | 3/2009 | Chalmers |
| 7,505,562 B2 | 3/2009 | Dinca |
| 7,508,910 B2 | 3/2009 | Safai |
| 7,517,149 B2 | 4/2009 | Agrawal |
| 7,519,148 B2 | 4/2009 | Kotowski |
| 7,538,325 B2 | 5/2009 | Mishin |
| 7,551,715 B2 | 6/2009 | Rothschild |
| 7,551,718 B2 | 6/2009 | Rothschild |
| 7,555,099 B2 | 6/2009 | Rothschild |
| 7,579,845 B2 | 8/2009 | Peschmann |
| 7,593,506 B2 | 9/2009 | Cason |
| 7,593,510 B2 | 9/2009 | Rothschild |
| 7,720,195 B2 | 5/2010 | Allman |
| 7,742,568 B2 | 6/2010 | Smith |
| 7,783,004 B2 | 8/2010 | Kotowski |
| 7,783,005 B2 | 8/2010 | Kaval |
| 7,796,733 B2 | 9/2010 | Hughes |
| 7,796,734 B2 | 9/2010 | Mastronardi |
| 7,809,109 B2 | 10/2010 | Mastronardi |
| 7,817,776 B2 | 10/2010 | Agrawal |
| 7,856,081 B2 | 12/2010 | Peschmann |
| 7,864,920 B2 | 1/2011 | Rothschild |
| 7,876,880 B2 | 1/2011 | Kotowski |
| 7,924,979 B2 | 4/2011 | Rothschild |
| 7,963,695 B2 | 6/2011 | Kotowski |
| 7,995,705 B2 | 8/2011 | Allman |
| 7,995,707 B2 | 8/2011 | Rothschild |
| 8,000,436 B2 | 8/2011 | Seppi |
| 8,054,938 B2 | 11/2011 | Kaval |
| 8,135,110 B2 | 3/2012 | Morton |
| 8,135,112 B2 | 3/2012 | Hughes |
| 8,138,770 B2 | 3/2012 | Peschmann |
| 8,148,693 B2 | 4/2012 | Ryge |
| 8,194,822 B2 | 6/2012 | Rothschild |
| 8,199,996 B2 | 6/2012 | Hughes |
| 8,275,091 B2 | 9/2012 | Morton |
| 8,275,092 B1 | 9/2012 | Zhang |
| 8,325,871 B2 | 12/2012 | Grodzins |
| 8,331,535 B2 | 12/2012 | Morton |
| 8,345,819 B2 | 1/2013 | Mastronardi |
| 8,369,481 B2 * | 2/2013 | Shimada ............... G01N 23/083 378/57 |
| 8,389,942 B2 | 3/2013 | Morton |
| 8,401,147 B2 | 3/2013 | Ryge |
| 8,428,217 B2 | 4/2013 | Peschmann |
| 8,433,036 B2 | 4/2013 | Morton |
| 8,439,565 B2 | 5/2013 | Mastronardi |
| 8,442,186 B2 | 5/2013 | Rothschild |
| 8,451,974 B2 | 5/2013 | Morton |
| 8,457,274 B2 | 6/2013 | Arodzero |
| 8,483,356 B2 | 7/2013 | Bendahan |
| 8,503,605 B2 | 8/2013 | Morton |
| 8,503,606 B2 | 8/2013 | Rothschild |
| 8,532,823 B2 | 9/2013 | Mcelroy |
| 8,576,982 B2 | 11/2013 | Gray |
| 8,582,720 B2 | 11/2013 | Morton |
| 8,605,859 B2 | 12/2013 | Mastronardi |
| 8,638,904 B2 | 1/2014 | Gray |
| 8,668,386 B2 | 3/2014 | Morton |
| 8,670,522 B2 * | 3/2014 | Lee ........................ G03B 35/04 378/41 |
| 8,690,427 B2 | 4/2014 | Mastronardi |
| 8,731,137 B2 | 5/2014 | Arroyo |
| 8,735,833 B2 | 5/2014 | Morto |
| 8,750,452 B2 | 6/2014 | Kaval |
| 8,750,454 B2 | 6/2014 | Gozani |
| 8,774,357 B2 | 7/2014 | Morton |
| 8,774,362 B2 | 7/2014 | Hughes |
| 8,798,232 B2 | 8/2014 | Bendahan |
| 8,804,899 B2 | 8/2014 | Morton |
| 8,824,632 B2 | 9/2014 | Mastronardi |
| 8,831,176 B2 | 9/2014 | Morto |
| 8,842,808 B2 | 9/2014 | Rothschild |
| 8,861,684 B2 | 10/2014 | Al-Kofahi |
| 8,884,236 B2 | 11/2014 | Rothschild |
| 8,885,794 B2 | 11/2014 | Morton |
| 8,903,045 B2 | 12/2014 | Schubert |
| 8,903,046 B2 | 12/2014 | Morton |
| 8,908,831 B2 | 12/2014 | Bendahan |
| 8,923,481 B2 | 12/2014 | Schubert |
| 8,929,509 B2 | 1/2015 | Morton |
| 8,958,526 B2 | 2/2015 | Morton |
| 8,971,487 B2 | 3/2015 | Mastronardi |
| 8,993,970 B2 | 3/2015 | Morton |
| 8,995,619 B2 | 3/2015 | Gray |
| 9,014,339 B2 | 4/2015 | Grodzins |
| 9,020,100 B2 | 4/2015 | Mastronardi |
| 9,020,103 B2 | 4/2015 | Grodzins |
| 9,042,511 B2 | 5/2015 | Peschmann |
| 9,052,271 B2 | 6/2015 | Grodzins |
| 9,052,403 B2 | 6/2015 | Morton |
| 9,057,679 B2 | 6/2015 | Morton |
| 9,069,101 B2 | 6/2015 | Arroyo, Jr. |
| 9,099,279 B2 | 8/2015 | Rommel |
| 9,117,564 B2 | 8/2015 | Rommel |
| 9,121,958 B2 | 9/2015 | Morton |
| 9,128,198 B2 | 9/2015 | Morton |
| 9,146,201 B2 | 9/2015 | Schubert |

(56) References Cited

U.S. PATENT DOCUMENTS

| | | |
|---|---|---|
| 9,158,030 B2 | 10/2015 | Morton |
| 9,182,516 B2 | 11/2015 | Gray |
| 9,183,647 B2 | 11/2015 | Morton |
| 9,207,195 B2 | 12/2015 | Gozani |
| 9,208,988 B2 | 12/2015 | Morton |
| 9,223,050 B2 | 12/2015 | Kaval |
| 9,251,915 B2 | 2/2016 | Lai |
| 9,257,208 B2 | 2/2016 | Rommel |
| 9,268,058 B2 | 2/2016 | Peschmann |
| 9,285,325 B2 | 3/2016 | Gray |
| 9,285,488 B2 | 3/2016 | Arodzero |
| 9,291,582 B2 | 3/2016 | Grodzins |
| 9,291,741 B2 | 3/2016 | Gray |
| 9,316,760 B2 | 4/2016 | Bendahan |
| 9,417,060 B1 | 8/2016 | Schubert |
| 9,465,135 B2 | 10/2016 | Morton |
| 9,466,456 B2 | 10/2016 | Rommel |
| 9,535,019 B1 | 1/2017 | Rothschild |
| 9,541,510 B2 | 1/2017 | Arodzero |
| 9,562,866 B2 | 2/2017 | Morton |
| 9,576,766 B2 | 2/2017 | Morton |
| 9,606,259 B2 | 3/2017 | Morton |
| 9,632,205 B2 | 4/2017 | Morton |
| 9,658,343 B2 | 5/2017 | Arodzero |
| 9,791,590 B2 | 10/2017 | Morton |
| 9,823,201 B2 | 11/2017 | Morton |
| 9,841,386 B2 | 12/2017 | Grodzins |
| 9,915,752 B2 | 3/2018 | Peschmann |
| 9,958,569 B2 | 5/2018 | Morton |
| 10,134,254 B2 | 11/2018 | Jarvi |
| 10,168,445 B2 | 1/2019 | Morton |
| 10,209,372 B2 | 2/2019 | Arodzero |
| 10,228,487 B2 | 3/2019 | Mastronardi |
| 10,266,999 B2 | 4/2019 | Rothschild |
| 10,295,483 B2 | 5/2019 | Morton |
| 10,408,967 B2 | 9/2019 | Morton |
| 10,670,740 B2 | 6/2020 | Couture |
| 10,724,192 B2 | 7/2020 | Rothschild |
| 10,762,998 B2 | 9/2020 | Rothschild |
| 10,770,195 B2 | 9/2020 | Rothschild |
| 10,794,843 B2 | 10/2020 | Rothschild |
| 10,830,911 B2 | 11/2020 | Couture |
| 10,976,465 B2 | 4/2021 | Morton |
| 2001/0016028 A1 | 8/2001 | Adams |
| 2001/0046275 A1 | 11/2001 | Hussein |
| 2002/0082492 A1 | 6/2002 | Grzeszczuk |
| 2002/0117625 A1 | 8/2002 | Pandelisev |
| 2003/0223549 A1 | 12/2003 | Winsor |
| 2004/0004482 A1 | 1/2004 | Bouabdo |
| 2004/0057554 A1 | 3/2004 | Bjorkholm |
| 2004/0086078 A1 | 5/2004 | Adams |
| 2004/0104347 A1 | 6/2004 | Bross |
| 2004/0109653 A1 | 6/2004 | Kerr |
| 2004/0140431 A1 | 7/2004 | Schmand |
| 2004/0141584 A1 | 7/2004 | Bernardi |
| 2004/0218714 A1 | 11/2004 | Faust |
| 2004/0251415 A1 | 12/2004 | Verbinski |
| 2004/0256565 A1 | 12/2004 | Adams |
| 2005/0018814 A1 | 1/2005 | Kerschner |
| 2005/0053199 A1 | 3/2005 | Miles |
| 2005/0078793 A1 | 4/2005 | Ikeda |
| 2005/0135560 A1 | 6/2005 | Dafni |
| 2005/0185757 A1 | 8/2005 | Kresse |
| 2005/0190878 A1 | 9/2005 | De Man |
| 2005/0236577 A1 | 10/2005 | Katagiri |
| 2006/0078091 A1 | 4/2006 | Lasiuk |
| 2006/0251211 A1 | 11/2006 | Grodzins |
| 2007/0009088 A1 | 1/2007 | Edic |
| 2007/0019781 A1 | 1/2007 | Haras |
| 2007/0029493 A1 | 2/2007 | Kniss |
| 2007/0098142 A1 | 5/2007 | Rothschild |
| 2007/0222981 A1 | 9/2007 | Ponsardin |
| 2007/0235655 A1 | 10/2007 | Rhiger |
| 2007/0237294 A1 | 10/2007 | Hoff |
| 2007/0258562 A1 | 11/2007 | Dinca |
| 2007/0280417 A1 | 12/2007 | Kang |
| 2008/0037707 A1 | 2/2008 | Rothschild |
| 2008/0043913 A1 | 2/2008 | Annis |
| 2008/0099692 A1 | 5/2008 | Poreira |
| 2008/0152081 A1 | 6/2008 | Cason |
| 2008/0197279 A1 | 8/2008 | Kang |
| 2008/0219804 A1 | 9/2008 | Chattey |
| 2008/0273652 A1 | 11/2008 | Arnold |
| 2009/0067575 A1 | 3/2009 | Seppi |
| 2009/0086907 A1 | 4/2009 | Smith |
| 2009/0103686 A1 | 4/2009 | Rothschild |
| 2009/0116617 A1 | 5/2009 | Mastronardi |
| 2009/0188379 A1 | 7/2009 | Hiza |
| 2009/0230295 A1 | 9/2009 | Waring |
| 2009/0230925 A1 | 9/2009 | Nathan |
| 2009/0257555 A1 | 10/2009 | Chalmers |
| 2009/0268871 A1 | 10/2009 | Rothschild |
| 2009/0274270 A1 | 11/2009 | Kotowski |
| 2009/0309034 A1 | 12/2009 | Yoshida |
| 2010/0061509 A1 | 3/2010 | D Ambrosio et al. |
| 2010/0072398 A1 | 3/2010 | Fruehauf |
| 2010/0091947 A1 | 4/2010 | Niu |
| 2010/0108859 A1 | 5/2010 | Andressen |
| 2010/0270462 A1 | 10/2010 | Nelson |
| 2010/0276602 A1 | 11/2010 | Clothier |
| 2011/0079726 A1 | 4/2011 | Kusner |
| 2011/0110490 A1 | 5/2011 | Samant |
| 2011/0206179 A1 | 8/2011 | Bendahan |
| 2011/0215222 A1 | 9/2011 | Eminoglu |
| 2011/0309253 A1 | 12/2011 | Rothschild |
| 2011/0309257 A1 | 12/2011 | Menge |
| 2012/0033791 A1 | 2/2012 | Mastronardi |
| 2012/0061575 A1 | 3/2012 | Dunleavy |
| 2012/0076257 A1 | 3/2012 | Star-Lack |
| 2012/0104265 A1 | 5/2012 | Workman |
| 2012/0148020 A1 | 6/2012 | Arroyo, Jr. |
| 2012/0199753 A1 | 8/2012 | Chuang |
| 2012/0280132 A1 | 11/2012 | Nakamura |
| 2012/0298864 A1 | 11/2012 | Morishita |
| 2013/0039463 A1 | 2/2013 | Mastronardi |
| 2013/0156156 A1 | 6/2013 | Roe |
| 2013/0195248 A1 | 8/2013 | Rothschild |
| 2013/0202089 A1 | 8/2013 | Schubert |
| 2013/0208857 A1 | 8/2013 | Arodzero |
| 2013/0315368 A1 | 11/2013 | Turner |
| 2014/0105367 A1 | 4/2014 | Horvarth |
| 2014/0110592 A1 | 4/2014 | Nelson |
| 2014/0182373 A1 | 7/2014 | Sbihli |
| 2015/0016794 A1 | 1/2015 | Mori |
| 2015/0055751 A1 | 2/2015 | Funk |
| 2015/0060673 A1 | 3/2015 | Zimdars |
| 2015/0168589 A1 | 6/2015 | Morton |
| 2015/0355117 A1 | 12/2015 | Morton |
| 2016/0025888 A1 | 1/2016 | Peschmann |
| 2016/0025889 A1 | 1/2016 | Morton |
| 2016/0170044 A1 | 6/2016 | Arodzero |
| 2016/0170077 A1 | 6/2016 | Morton |
| 2016/0223706 A1 | 8/2016 | Franco |
| 2017/0023696 A1* | 1/2017 | Morton ............... G01V 5/0025 |
| 2017/0045630 A1 | 2/2017 | Simon |
| 2017/0059739 A1 | 3/2017 | Mastronardi |
| 2017/0184516 A1 | 6/2017 | Chen |
| 2017/0200524 A1 | 7/2017 | Adler |
| 2017/0245819 A1 | 8/2017 | Rothschild |
| 2017/0299526 A1 | 10/2017 | Morton |
| 2017/0299764 A1 | 10/2017 | Morton |
| 2017/0315242 A1 | 11/2017 | Arodzero |
| 2017/0358380 A1 | 12/2017 | Rothschild |
| 2018/0038969 A1 | 2/2018 | Mccollough |
| 2018/0038988 A1 | 2/2018 | Morton |
| 2018/0106735 A1 | 4/2018 | Gellineau |
| 2018/0128935 A1 | 5/2018 | Morton |
| 2018/0136340 A1 | 5/2018 | Nelson |
| 2018/0252841 A1 | 9/2018 | Grodzins |
| 2018/0284316 A1 | 10/2018 | Morton |
| 2018/0286624 A1 | 10/2018 | Rommel |
| 2018/0294066 A1 | 10/2018 | Rothschild |
| 2018/0313770 A1 | 11/2018 | Morton |
| 2018/0328861 A1 | 11/2018 | Grodzins |

(56) References Cited

U.S. PATENT DOCUMENTS

| | | |
|---|---|---|
| 2019/0139385 A1 | 5/2019 | Jarvi |
| 2019/0293810 A1 | 9/2019 | Couture |
| 2019/0346382 A1 | 11/2019 | Rothschild |
| 2019/0383953 A1 | 12/2019 | Arodzero |
| 2020/0025955 A1 | 1/2020 | Gozani |
| 2020/0033274 A1 | 1/2020 | Couture |
| 2020/0073008 A1 | 3/2020 | Parikh |
| 2020/0103357 A1 | 4/2020 | Morton |
| 2020/0103547 A1 | 4/2020 | Morton |
| 2020/0158908 A1 | 5/2020 | Morton |
| 2020/0191991 A1 | 6/2020 | Morton |
| 2020/0233100 A1 | 7/2020 | Rothschild |
| 2020/0326291 A1 | 10/2020 | Rothschild |
| 2020/0326436 A1 | 10/2020 | Couture |
| 2020/0355631 A1 | 11/2020 | Yu |
| 2020/0355632 A1 | 11/2020 | Morton |
| 2021/0018650 A1 | 1/2021 | Morton |

FOREIGN PATENT DOCUMENTS

| | | |
|---|---|---|
| CN | 102519988 A | 6/2012 |
| CN | 104204854 A | 12/2014 |
| CN | 107209282 A | 9/2017 |
| DE | 2639631 A1 | 3/1978 |
| DE | 4017100 A1 | 12/1990 |
| DE | 102013102749 A1 | 10/2013 |
| EP | 113291 A1 | 7/1984 |
| EP | 0261984 A2 | 3/1988 |
| EP | 0813692 | 12/1997 |
| EP | 0813692 A1 | 12/1997 |
| EP | 0864884 A2 | 9/1998 |
| EP | 0971215 A1 | 1/2000 |
| EP | 1168249 A1 | 1/2002 |
| EP | 1135700 | 3/2005 |
| EP | 1254384 | 1/2008 |
| EP | 2054741 | 5/2009 |
| EP | 1733213 | 2/2010 |
| EP | 2049888 | 5/2014 |
| EP | 3271709 A1 | 1/2018 |
| FR | 2492159 A1 | 4/1982 |
| GB | 1505498 A | 3/1978 |
| GB | 2084829 A | 4/1982 |
| GB | 2150526 A | 7/1985 |
| GB | 2277013 A | 10/1994 |
| GB | 2400480 A | 10/2004 |
| GB | 2482024 A | 1/2012 |
| JP | 58103678 | 6/1983 |
| JP | 62147349 A | 7/1987 |
| JP | S63299100 | 12/1988 |
| JP | 10232284 A | 2/1997 |
| JP | H10185842 | 7/1998 |
| JP | 2000515629 | 11/2000 |
| JP | 2006505805 | 2/2006 |
| JP | 2013205122 | 10/2013 |
| JP | 3195776 | 2/2015 |
| WO | 9701089 | 1/1997 |
| WO | 1997001089 A1 | 1/1997 |
| WO | 9802763 A | 1/1998 |
| WO | 1998002763 A1 | 1/1998 |
| WO | 1998003889 A1 | 1/1998 |
| WO | 9805946 A1 | 2/1998 |
| WO | 1998020366 A1 | 5/1998 |
| WO | 9913323 A2 | 3/1999 |
| WO | 1999039189 A2 | 8/1999 |
| WO | 2000033060 A | 6/2000 |
| WO | 2000037928 A2 | 6/2000 |
| WO | 0159485 A1 | 8/2001 |
| WO | 0173415 A2 | 10/2001 |
| WO | 02091023 A2 | 11/2002 |
| WO | 03075037 A1 | 9/2003 |
| WO | 2004010127 A1 | 1/2004 |
| WO | 2004043740 A2 | 5/2004 |
| WO | 2005079437 A2 | 9/2005 |
| WO | 2005098400 A2 | 10/2005 |
| WO | 2005103759 | 11/2005 |
| WO | 2005103759 A1 | 11/2005 |
| WO | 2006111323 | 10/2006 |
| WO | 2006111323 A2 | 10/2006 |
| WO | 2007051092 A2 | 5/2007 |
| WO | 2008021807 A2 | 2/2008 |
| WO | 2008024825 A2 | 2/2008 |
| WO | 2008063695 A2 | 5/2008 |
| WO | 2008105782 A2 | 9/2008 |
| WO | 2009027667 A2 | 3/2009 |
| WO | 2009067394 A2 | 5/2009 |
| WO | 2010129926 A1 | 11/2010 |
| WO | 2011008718 A1 | 1/2011 |
| WO | 2011011583 A1 | 1/2011 |
| WO | 2011014445 A1 | 2/2011 |
| WO | 2011053972 A2 | 5/2011 |
| WO | 2011149566 A2 | 12/2011 |
| WO | 2011163108 | 12/2011 |
| WO | 2011163108 A2 | 12/2011 |
| WO | 2012058207 A2 | 5/2012 |
| WO | 2012109307 A1 | 8/2012 |
| WO | 2012142453 A2 | 10/2012 |
| WO | 2012142456 A2 | 10/2012 |
| WO | 2012174265 A1 | 12/2012 |
| WO | 2013112819 A1 | 8/2013 |
| WO | 2013116058 A1 | 8/2013 |
| WO | 2013122763 A1 | 8/2013 |
| WO | 2014058495 A2 | 4/2014 |
| WO | 2016003547 A1 | 1/2016 |
| WO | 2016081881 A1 | 5/2016 |
| WO | 2018064434 | 4/2018 |
| WO | 2019217596 A1 | 11/2019 |
| WO | 2020041161 A1 | 2/2020 |

OTHER PUBLICATIONS

Written Opinion of the International Searching Authority for PCT/US20/37716, dated Sep. 9, 2020.

Williams et al.:"PET Detector Using Waveshifting Optical Fibers and Microchannel Plate PMT with Delay Line Readout", IEEE Transactions on Nuclear Science, IEEE Service Center, New York, Ny, US, vol. 45, No. 2, Apr. 1, 1998 (1998-04-01), pp. 195-205, XP011087844, Issn: 0018-9499, DOI: 10.1109/23.664171.

Beznosko et al., "FNAL-NICADD Extruded Scintillator," FERMILAB-CONF-04-216-E, pp. 1-4 (Sep. 2004).

Case et al., "Wavelength-shifting fiber readout of LaC13 and LaBr3 scintillators," Proc. of SPIE, vol. 5898, UV, X-Ray, and Gamma-Ray Space Instrumentation for Astronomy XIV, p. 58980K-1-58980K-8 (2005).

Gundiah, "Scintillation properties of Eu.sup.2+-activated barium fluoroiodide," Lawrence Berkeley National Laboratory, pp. 1-10 (Feb. 2011).

Hutchinson et al., "Optical Readout for Imaging Neutron Scintillation Detectors," Engineering Science and Technology Division, Oak Ridge National Laboratory, Oak Ridge, Tennessee, 6 pages. (Nov. 2002).

Keizer, "The optimal cosmic ray detector for High-Schools," 21 pages (2011).

Maekawa et al., "Thin Beta-ray Detectors using Plastic Scintillator Combined with Wavelengthshifting Fibers for Surface Contamination Monitoring," J. Nucl. Sci. Technol., vol. 35, No. 12, pp. 886-894 (Dec. 1998).

Moiseev et al., "High-efficiency plastic scintillator detector with wavelength-shifting fiber readout for the GLAST Large Area Telescope," Nucl. Instrum. Meth. Phys. Res. A, vol. 583, pp. 372-381 (2007).

Nishikido et al. "X-ray detector made of plastic scintillators and WLS fiber for real-time dose distribution monitoring in interventional radiology," IEEE Nuclear Science Symposium and Medical Imaging Conference Record.

Pla-Dalmau et al., "Extruded Plastic Scintillator for Minerva," FERMILAB-CONF-05-506-E, pp. 1298-1300 (2005).

Yoshimura et al., "Plastic scintillator produced by the injection-molding technique," Nucl. Instr. Meth. Phys. Res. A, vol. 406, pp. 435-441 (1998).

(56) References Cited

OTHER PUBLICATIONS

Jae Yul Ahn, Authorized officer Korean Intellectual Property Office, International Search Report-Application No. PCT/US2013/024585, date of mailing Jun. 2, 2013, along with Written Opinion of the International Searchi.

Nishikido et al. "X-ray detector made of plastic scintillators and WLS fiber for real-time dose distribution monitoring in interventional radiology," IEEE Nuclear Science Symposium and Medical Imaging Conference Reco, pp. 1272-1274 (2012).

International Search Report for PCT/US17/54211, dated Jan. 18, 2018.

International Search Report for PCT/US2019/027242, dated Jul. 17, 2019.

Rose, Kathryn, "NuMI Off-Axis Experiment" Datasheet (online). University of Oxford & Rutherford Appleton Laboratory, 2003. <URL: https://slideplayer.com/slide/8765673/>.

International Search Report for PCT/US2019/027252, dated Aug. 2, 2019.

International Search Report for PCT/US2013/024585, dated Jun. 2, 2013.

https://en.wikipedia.Org/wiki/ISM_band#Common_non-ISM_uses., downloaded from Internet Nov. 23, 2020.

International Search Report for PCT/US2013/023125, dated May 15, 2013.

International Search Report for PCT/US99/29185, dated Sep. 27, 2000.

Chou, C, "Fourier coded-aperture imaging in nuclear medicine", IEEE Proc. Sci. Meas. Technol., vol. 141. No. 3, May 1994, pp. 179-184.

Mertz, L.N., et al., "Rotational aperture synthesis for x rays", Journal. Optical Society of America, vol. 3, Dec. 1986, pp. 2167-2170.

International Bureau of WIPO, International Preliminary Report on Patentability, PCT/US2005/011382, dated Oct. 19, 2006, 7 pages.

International Search Report and Written Opinion for PCT/US2010/041757, dated Oct. 12, 2010.

European Patent Office, International Search Report, International Application No. PCT/US99/28266, dated Sep. 6, 2000, 3 pages.

Written Opinion of the International Searching Authority, PCT/US2007/066936, dated Sep. 30, 2008, 7 pages.

International Search Report, PCT/US1999/028035, dated Sep. 15, 2000, 6 pages.

International Search Report, PCT/US1998/18642, dated Jul. 7, 1999, 4 pages.

International Search Report, PCT/US2007/066936; dated: Sep. 30, 2008, 5 pages.

European Patent Office, International Search Report and Written Opinion of the International Searching Authority, PCT/US2005/011382, dated Oct. 21, 2005.

Nittoh et al., "Discriminated neutron and X-ray radiography using multi-color scintillation detector," Nuclear Instruments and Methods in Physics Research A, vol. 428, pp. 583-588 (1999).

Novikov, "A method for monitoring of Gd concentration in Gd-loaded scintillators," Nuclear Instruments and Methods in Physics Research A, vol. 366, pp. 413-414 (1995).

International Search Report for PCT/US2016/023240, dated Jul. 12, 2016.

Osswald et al. "Injection Molding Handbook", p. 394, Chemical Industry Press, Mar. 31, 2005.

Yoshiaki et al. "Development of ultra-high sensitivity bioluminescent enzyme immunoassay for prostate-specific antigen (PSA) using firefly luciferas", Abstract, Luminescence, vol. 16, Issue 4, Jul. 31, 2001.

International Search Report for PCT/US01/09784, dated Jan. 28, 2002.

International Search Report for PCT/US02/13595, dated Aug. 6, 2002.

International Search Report for PCT/US03/35232, dated Nov. 8, 2004.

International Search Report for PCT/US03/05958, dated Jun. 27, 2003.

International Search Report for PCT/US2005/011382, dated Oct. 21, 2005.

International Seach Report for PCT/US2008/083741, dated Oct. 30, 2009.

International Search Report for PCT/US2007/066936, dated Sep. 30, 2008.

International Search Report for PCT/US2006/060158, dated Jul. 5, 2007.

International Search Report for PCT/US2007/076497, dated Jul. 28, 2008.

International Search Report for PCT/US2007/075323, dated Feb. 5, 2008.

International Search Report for PCT/US2010/043201, dated Oct. 29, 2010.

International Search Report for PCT/US2012/024248, dated Jul. 9, 2012.

International Search Report for PCT/US11/23143, dated Nov. 25, 2011.

International Search Report for PCT/US2012/033581, dated Oct. 31, 2012.

International Search Report for PCT/US2011/041033, dated Feb. 17, 2012.

International Search Report for PCT/US2012/033585, dated Nov. 29, 2012.

International Search Report for PCT/US2013/022715, dated May 15, 2013.

International Search Report for PCT/US2015/031115, dated Jul. 29, 2015.

* cited by examiner

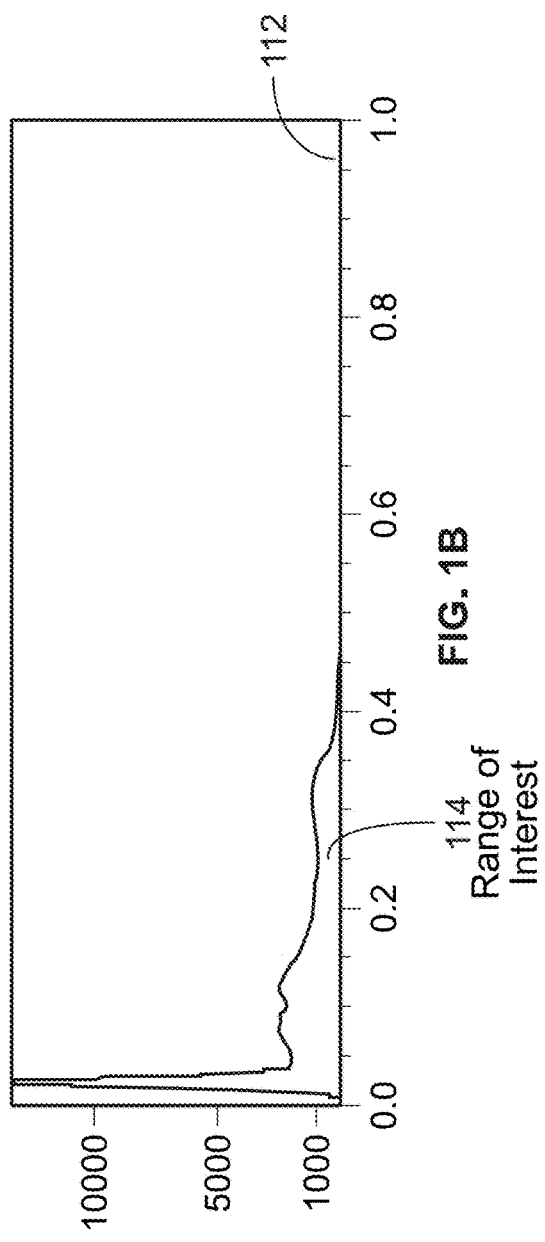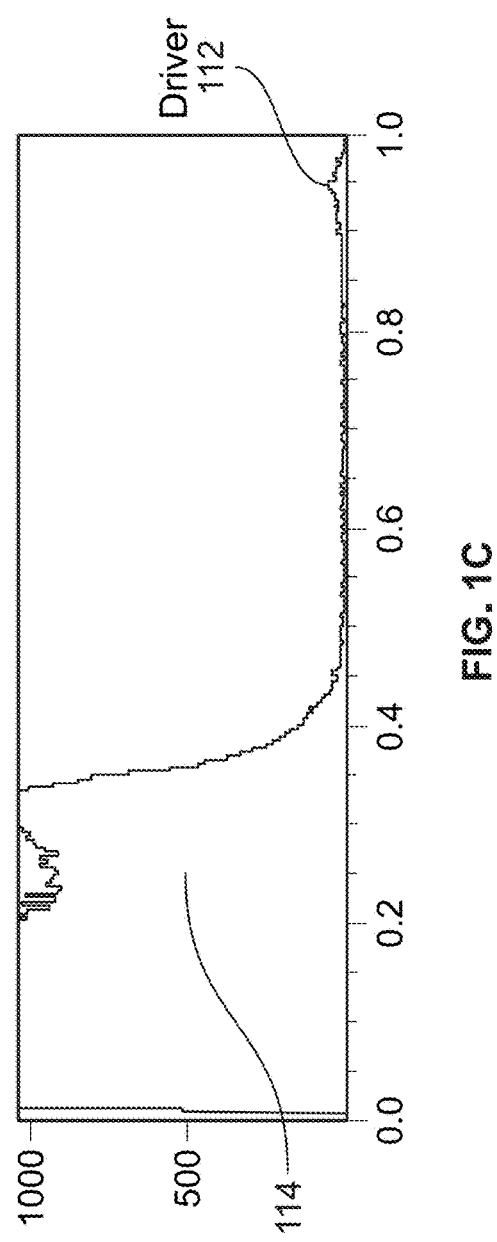

SCATTER X-RAY IMAGING WITH ADAPTIVE SCANNING BEAM INTENSITY

FIELD

The present specification relates to X-ray imaging systems, and, in particular, X-ray scatter imaging systems and methods with adaptive X-ray beam dosing for different areas of a target object.

BACKGROUND

Scatter imaging systems emit X-ray beams that produce a secondary type of radiation, known as scatter radiation, after the X-ray beam enters an inspection area comprising a target object. A scatter imaging system typically uses a steerable beam of X-ray radiation, also referred to as a pencil beam, which scans the object under inspection. The area where the beam impinges on the target object is referred to as a "beam spot". A fraction of the X-rays may be Compton-scattered when the beam of X-rays interacts with the target object. The detectors are typically positioned to capture as much of the scatter radiation as possible. The detector's signal is used to sequentially form an image of the target object.

The signal strength of the detected scatter radiation depends on the nature of the target object and a distance of the target object from the source of the X-ray beam. Particularly, material composition and dimensions of the target object relative to a beam spot size determine an amount of scatter radiation. Target objects having materials with low atomic numbers, and an areal density sufficient to interact with most of the beam's X-rays, generate the most scatter radiation. For example, plastics, sugar, water, oil, and the human body tend to generate the most scatter radiation, and, in a scatter image, these materials appear bright with a relatively high signal to noise ratio (SNR). Less scatter radiation is generated by materials with high atomic numbers, such as metals, due to the photoelectric effect, which dominates interaction with the X-ray beam. Accordingly, materials with higher atomic numbers appear darker in the scatter image. Thin layers of materials with higher atomic numbers may also obscure the signals of low atomic number materials that may be located behind them, thus reducing the brightness and SNR. In this case, increasing the X-ray beam power increases the SNR, thereby increasing the relative visibility of the obscured objects.

FIG. 1A illustrates an exemplary backscatter image 100 of a car with a driver. The human driver appears as a bright area 102 in the image, as humans are comprised of dense, low atomic number materials. Conversely, the body of the car, which is mostly metal and includes higher atomic number materials, appears as darker areas 104 relative to the bright areas 102, within the complete image of the target object. The distance between the X-ray imaging system and the target object is critical for two main reasons.

First, a scanning X-ray beam always has some divergence. With increasing distance, the beam spot projected onto the object increases in size, thus reducing the spatial resolution of the image. The amount of scatter radiation generated per time, however, remains the same (not taking into consideration attenuation by air) as long as the object is large enough to accommodate the entire beam spot. Notwithstanding this effect, the scatter signal decreases with increasing distance because the detectors will receive a smaller fraction of the scattered radiation due to the decrease of solid angle of the detectors. The detected scatter signal decreases with approximately the square of the distance.

Second, if the target object is smaller than the beam spot projected onto it (and thus, is entirely covered by the beam spot), the detected scatter signal decreases with approximately the fourth power of the distance. This is the case because an even smaller fraction of the expanding beam spot will generate scatter radiation. The assumption is that the fraction of the beam that does not reach or "cover" the target object will not scatter off of other objects further back. For elongated objects, like rods or wires, that have one dimension larger than the beam spot and another dimension smaller than the beam spot, the signal decreases with the third power of the distance. Therefore, for a distance 'r', the signal is the combination of $1/r$ due to reduced effective area of the beam spot and $r^{-2}$ due to the reduced solid angle of the detectors.

For an imaging system with azimuthal scan motion, the X-ray beam dose received by the target object decreases with a square of the distance. Azimuthal scan motion imaging systems produce images with central projection in both dimensions. For imaging systems with linear scan motion, which produce mixed projection images (parallel along the linear scan motion and central in the other dimension), the X-ray dose decreases inverse to the distance.

The detected signal is dominated by Poisson statistics. Since noise is quantified as the standard deviation of the signal, and for a Poisson signal, the standard deviation is the square root of the signal, the SNR in the image varies similarly to the square root of the signal.

Accordingly, bright image areas have a higher SNR than less bright areas. Increasing the imaging X-ray dose either by scanning at a slower speed or increasing the beam power improves image quality and, as a result, detection performance. However, when imaging people with X-rays the dose must be minimized to reduce the harmful effects of the radiation. These competing goals, for improving image quality and minimizing X-ray dose, have spurred many refinements in X-ray imaging systems, especially the most common transmission imaging systems.

U.S. Pat. No. 2,773,117, entitled "Cathode Ray Tube Beam Intensity Control", discloses "[a] cathode ray tube system comprising a cathode ray tube having means for generating an electron beam, means including a control electrode for varying the intensity of said beam and a beam intercepting member, means for producing a signal having variations determined by the intensity variations of said beam, means coupled to said signal producing means for limiting the amplitude of said signal when said beam intensity exceeds a given value, and means for applying said signal to said beam intensity control means in a sense to oppose variations in the intensity of said beam when the intensity value thereof is less than said given value." The primary objective of U.S. Pat. No. 2,773,117 is to create constant beam intensity by deriving a feedback signal from the electron beam directly so as to detect beam variation.

U.S. Pat. No. 4,998,270 ("the '270 patent), entitled "Mammographic apparatus with collimated controllable X-ray intensity and plurality filters", discloses "[a] method of improving imaging in an X-ray mammography machine having a controllable X-ray source for generating an X-ray beam of selected radiation intensity and a target area for the X-ray beam, the method comprising the steps of: directing the X-ray beam in a preselected configuration onto a part of the target area; detecting the radiation intensity of the X-ray beam in each of a plurality of substantially equal segments of the target area; identifying at least one segment of lowest radiation intensity; adjusting the X-ray source to establish a predetermined radiation intensity in the identified at least one segment; identifying other segments each having a radiation intensity greater than a predetermined percentage of the predetermined radiation intensity in the identified at least one segment; and attenuating the radiation intensity directed toward the identified other segments."

U.S. Pat. No. 5,054,048 ("the '048 patent), entitled "X-ray radiography method and system", discloses "[a] system for imaging an object with a scanning beam of penetrating radiation which is modulated prior to impinging on the object, comprising: a source which generates penetrating radiation at an origin; a scanning mechanism which forms said penetrating radiation into an impinging beam and scans an object with said impinging beam in a scanning direction to cause an object-attenuated beam to emerge from said object; an imaging receptor which receives said object-attenuated beam and in response forms an image of said object; and a modulator which is between the source and the object position and comprises at least one row of modulation elements which extends in a direction transverse to the scanning direction; said modulation elements being generally wedge-shaped in a section which is in a plane that includes the radiation origin and the scanning direction; and a control circuit which selectively moves the modulation elements along the scanning direction as the impinging beam scans the object position to selectively modulate respective portions of the impinging beam in order to selectively equalize the image formed by said imaging receptor; wherein said modulating elements are generally wedge-shaped over a distance in the scanning direction which is at least a substantial portion of the dimension of the beam in the scanning direction at the place where the elements modulate the beam."

The '270 and '048 patents, described above, teach the optimization of a transmission imaging system with fan beam through the use of adjustable filters and/or masks.

U.S. Patent Application No. 20130329855, entitled "Systems and Methods for Using an Intensity-Modulated X-Ray Source", discloses "[a]n X-ray scanning system comprising: a. A plurality of detectors; b. A controller, wherein said controller is configured to receive and identify a minimum X-ray transmission level detected by at least one of said plurality of detectors, wherein said controller compares said minimum X-ray transmission level to at least one predetermined threshold transmission level, and wherein, based on said comparison, said controller generates an adjustment signal; and c. An X-ray source, wherein said X-ray source receives said adjustment signal and is configured to adjust an X-ray pulse duration based on said adjustment signal." This patent however applies exclusively to transmission imaging systems with pulsed X-ray sources.

In inspection processes that are used to scan persons the available dose per image and thus the image quality is limited by the maximum acceptable dose received by humans. Particular imaging conditions, such as the distance of a person from an X-ray source or occluding materials that may be shielding a person, are typically not known in advance. Thus it is to be assumed that imaging conditions are not favorable, meaning a person is too close to the X-ray source and/or is not well-shielded, among other conditions. This is advantageous in that in most cases the person receives a dose much lower than legally allowable, but at the same time imposes a severe constraint on image quality, and thus the detection performance of the inspection system.

What is needed are methods and systems for increasing the low SNR of the darker areas in a detected image by increasing the areal dose of the X-ray beam in those areas, improving both image quality and detection performance, for use in X-ray inspection processes that scan objects and humans in X-ray scatter applications. What is also needed are methods and systems for scanning bright image areas with a lower intensity X-ray beam, keeping within the acceptable limits of the X-ray dose for scanning people, and reducing the scatter dose to the operator of hand-held inspection systems.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses an X-ray scanning system adapted to generate and detect a scatter signal, the X-ray scanning system comprising: an X-ray source configured to emit an X-ray beam, having an X-ray beam intensity, towards an area over a target object for scanning the target object; at least one detector adapted to detect radiation scattered from the target object and generate a corresponding scatter radiation signal, wherein the scatter radiation signal is characterized, at least in part, by one or more brightness levels corresponding to one or more scanned areas of the target object; and a feedback controller, wherein the feedback controller is configured to receive the scatter radiation signal from the at least one detector, generate a control signal that is a function of the one or more brightness levels and that is based on the received scatter radiation signal, and transmit the control signal to the X-ray source and wherein the X-ray source is configured to receive the control signal and adjust the X-ray beam intensity based on the control signal.

Optionally, the X-ray source is an X-ray tube comprising a control grid. Optionally, the feedback controller is configured to compare a voltage of the control grid to the scatter radiation signal.

Optionally, the feedback controller receives the scatter radiation signal in analog form. Optionally, the feedback controller receives the scatter radiation signal from the at least one detector prior to the scatter radiation signal being processed by an analog to digital converter.

Optionally, the X-ray source is configured to operate with tube voltages between 50 kV and 500 kV.

Optionally, the control signal generated by the feedback controller is adapted to cause the X-ray source to reduce the X-ray beam intensity as the scatter radiation signal increases and increase the X-ray beam intensity as the scatter radiation signal decreases.

The at least one detector may comprise an organic scintillator detector.

Optionally, the feedback controller is configured to continuously adjust the X-ray beam intensity as the X-ray beam moves from one of the one or more scanned areas to another of the one or more scanned areas.

Optionally, the X-ray source is configured to adjust the X-ray beam intensity based on the detector signal while the X-ray source is operating and without having to wait until the X-ray source is turned off.

Optionally, a response time of the at least one detector is shorter than a pixel integration time for generating a detected image.

The present specification also discloses an X-ray scanning method for generating and detecting a backscatter signal, the method comprising: using an X-ray source, emitting an X-ray beam, having an X-ray beam intensity, toward an area of a target object for scanning the target object; using at least one detector, detecting backscatter radiation from the area of the target object and generating a corresponding backscatter signal, wherein the backscatter signal is characterized, at least in part, by one or more brightness levels corresponding to one or more scanned areas of the target object; using a feedback controller, receiving the backscatter radiation signal from the at least one detector, generating a control signal that is a function of the one or more brightness levels and that is based on the received backscatter signal, and transmitting the control signal to the X-ray source, wherein the X-ray source is configured to receive the control signal and adjust the X-ray beam intensity based on the control signal.

Optionally, the X-ray scanning method further comprises determining an intensity level required to improve an image quality of an image produced from the backscatter signal.

Optionally, the X-ray scanning method further comprises determining an intensity level required to reduce an intensity level for the one or more brightness levels above a threshold level.

Optionally, the X-ray scanning method further comprises determining an intensity level required to increase an intensity level for the one or more brightness levels below a threshold level.

Optionally, the feedback controller is configured to compare a voltage of a control grid of the X-ray source to the backscatter signal.

Optionally, the X-ray source is configured to operate with tube voltages between 50 kV and 500 kV.

The at least one detector may be an organic scintillator detector.

Optionally, the feedback controller receives the backscatter signal in analog form.

Optionally, the feedback controller receives the backscatter signal from the at least one detector prior to the backscatter signal being processed by an analog to digital converter.

Optionally, a response time of the at least one detector is shorter than a pixel integration time for generating a detected image from the backscatter signal.

Optionally, the signal generated by the feedback controller is adapted to cause the X-ray source to reduce the X-ray beam intensity as the backscatter signal increases and increase the X-ray beam intensity as the backscatter signal decreases.

Optionally, the feedback controller is configured to continuously adjust the X-ray beam intensity as the X-ray beam moves from one of the one or more scanned areas to another of the one or more scanned areas.

Optionally, the X-ray source is configured to adjust the X-ray beam intensity based on the signal while the X-ray source is operating and without having to wait until the X-ray source is turned off.

Optionally, the X-ray source is configured to adjust the X-ray beam intensity based on the signal while the X-ray beam moves from one of the one or more scanned areas to another of the one or more scanned areas without having to wait until the X-ray source is turned off or without having to wait until another target object is being scanned.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the detailed description when considered in connection with the accompanying drawings:

FIG. 1B shows the histogram of gray-values for each pixel in FIG. 1A;

FIG. 1C shows the same histogram as FIG. 1B but with enlarged y-axis;

DETAILED DESCRIPTION

The present specification is directed toward X-ray scatter imaging systems and methods that adapt the X-ray beam dose for different areas of a target object, in order to improve the Signal to Noise Ratio (SNR) of dark areas in the images. In embodiments, the present specification also provides systems and methods to adaptively scan areas of a target object with a lower intensity X-ray beam, and in particular those areas that generate bright areas in the images. In some embodiments, the present specification describes X-ray scatter imaging systems for use with applications that may inspect humans, either directly or indirectly, while keeping the X-ray beam intensity within the acceptable limits of X-ray dose for scanning people. In embodiments, the intensity of the scanning beam is adjustable within pixel integration time, which is used to reduce the scanning beam intensity for bright image areas and to increase the scanning beam intensity for dark image areas. Accordingly, in the time required for a detector signal to be generated representative of one or more pixels, the system a) acquires the requisite signal needed to determine what adjustments in intensity need to be made and b) performs the scanning beam intensity adjustment. The pixel integration time may extend to a few microseconds, whereas response time of the detector can be less than microseconds (for example, extending to a few tens of nanoseconds), allowing the signal to be adjusted during the pixel integration time.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

Figure 1A:
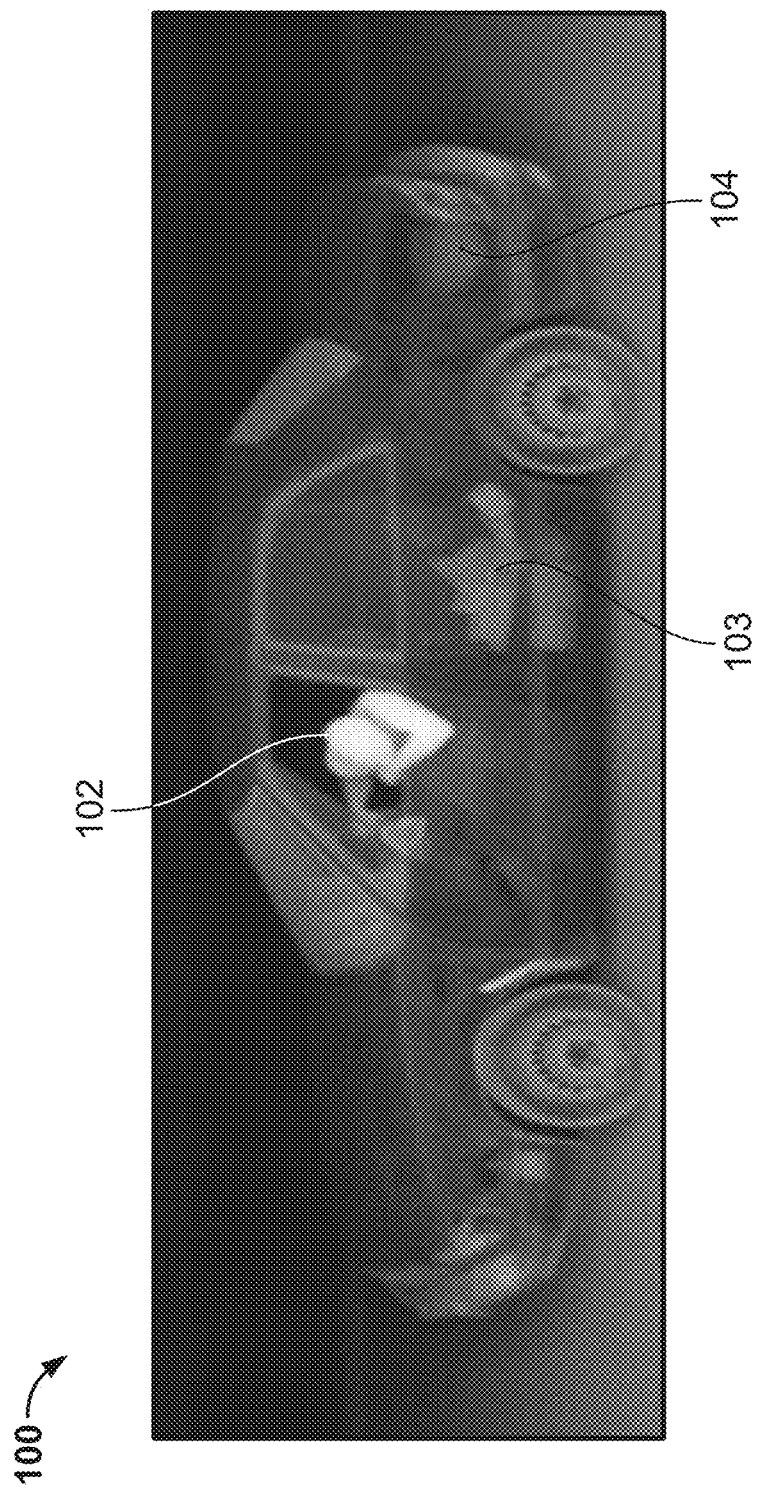
FIG. 1A is an illustration of an exemplary, unprocessed backscatter image of a car with a driver.

Using a dynamically modified beam intensity scatter radiation detection system has several advantages. For equivalent image quality, modulating intensity lowers the overall dose to the scanned object, and particularly to areas which appear bright in the traditional scatter image. This is of utmost importance for drive-through vehicle inspection systems, in order to reduce the dose to the people in the vehicle. A person not shielded by the vehicle, for example such as when driving with an open window, and close to the X-ray source, would receive the highest possible dose, thus generating the strongest possible scatter signal. This situation is illustrated by FIG. 1A where a person 102 is near the top of the images' dynamic range. Dynamically reducing the beam intensity significantly reduces the dose to that person. This will provide for inspection systems that allow for the use of high power and are also safe for imaging applications that are used to either directly scan people or inadvertently expose people, such as operators or bystanders, to X-rays.

The use of adaptive scan beam intensities also reduces the dynamic range required of the detectors and can eliminate the need for generalized gain adjustments, which can adversely affect the detection of other objects in the same inspection region, in response to changed inspection conditions. Further, in combination with a known outline of the scanned object, the use of adaptive scan beam intensities allows for a significant reduction in beam power while the scanning X-ray beam is not covering the object. The outline of the scanned object may be acquired before the scanning, for example, by an optical camera.

In embodiments, the present specification is directed toward X-ray scatter imaging systems and methods that adapt the X-ray beam dose for different areas of a target object while the X-ray system is in operation and in the course of scanning an object. Conventional systems, including transmission systems, adapt the scanning beams once a scan is complete. The adaptive techniques described herein, however, advantageously adapt, in real-time, the intensity of the pencil beam scanned over an object based on a detected signal. Thus, the dynamic modulation occurs while the beam is still being scanned over the object.

In addition, for scanning applications where people are in close proximity to the scanner, such as with the operator of handheld imaging systems, the use of adaptive scan beam intensities reduces operator exposure to scatter radiation. It also reduces the dose should the operator accidentally point the scanner towards a person in close proximity, including herself/himself.

Generally, the use of dynamic modification of intensity reduces the radiation footprint of the system. Further, the use of adaptive scan beam intensities reduces the energy consumption and cooling load of the X-ray generator.

Figure 2A:
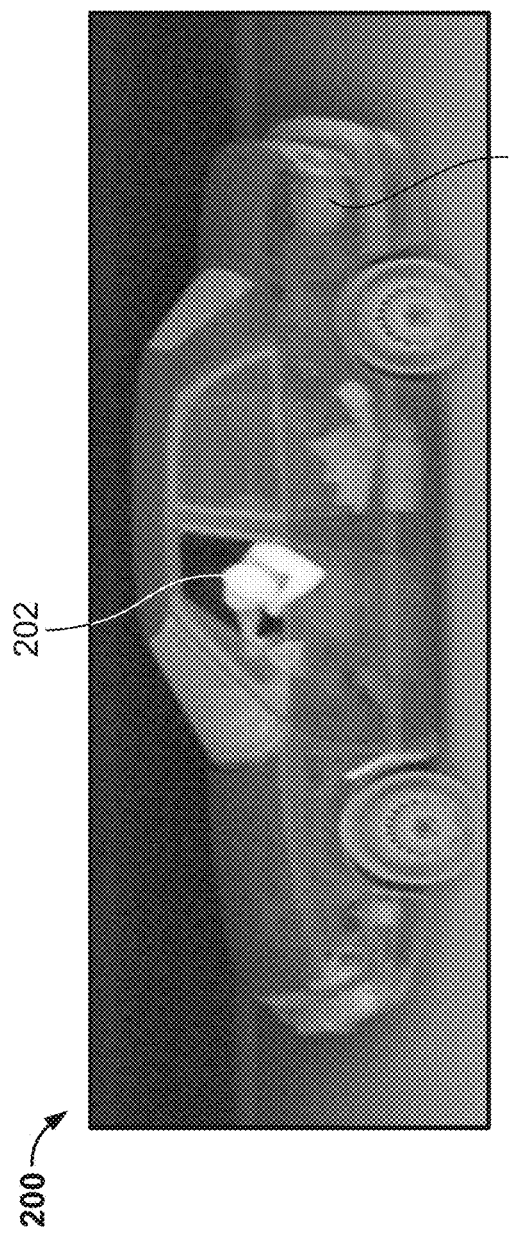
FIG. 2A shows the same image as FIG. 1A after applying a square-root-filter.
Figure 2B:
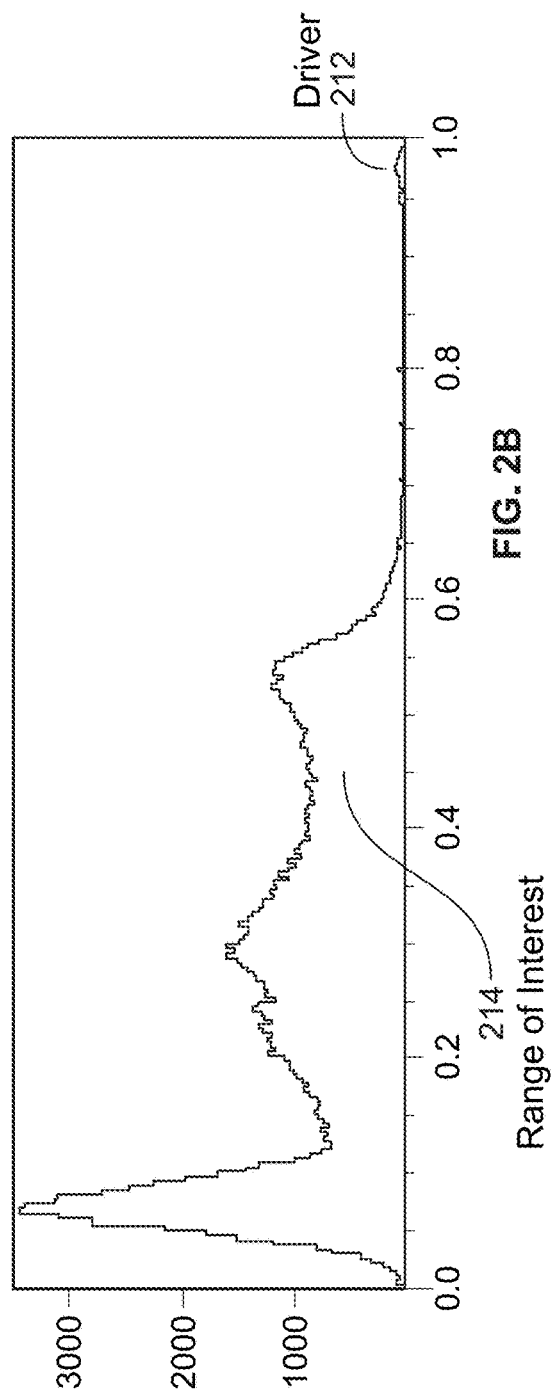
FIG. 2B shows the histogram of gray-values for each pixel in FIG. 2A.

FIG. 1A shows the unprocessed (raw) backscatter image of a car with a driver 102 and some clearly visible contraband 103 in the rear door panel and less visible contraband 104 in the trunk. FIG. 2A shows the same image after application of a filter, such as but not limited to a square-root-filter, on the original image of FIG. 1A, which brightens the darker areas of the image and compresses the brighter regions. As a result, the contraband 204 is now more visible in FIG. 2A. This is done to help the analyst identify objects or anomalies in the image, as the typical regions of interest in the image tend to be dark. These image regions correspond to the gray-value 'Range of Interest' in histograms of FIGS. 1B and 2B, shown as 114 and 214 (pointing to, in this example, approximately 0.25 and 0.45, respectively) respectively. It should be noted that in this context, the terms "tonal" and "gray-value" may be used interchangeably and are considered synonymous. The histograms of FIGS. 1B and 2B are graphical representations of tonal (or gray-value) distribution in the X-ray image. Areas 112 and 212, in FIGS. 1B and 2B, respectively show the contribution of the driver 102 to the gray-value. The effect of the filter is illustrated by the histograms of gray-values in FIG. 1B for FIG. 1A, and in FIG. 2B for FIG. 2A, respectively. The x-axis of these histograms spans the normalized signal intensity represented by the pixel gray-values between 0 (black) and 1 (white). The y-axis shows the number of pixels for each gray-value. FIG. 1C is a vertically expanded view of FIG. 1B to make the hardly noticeable contribution 112 of the driver 102 more visible.

Figure 3:
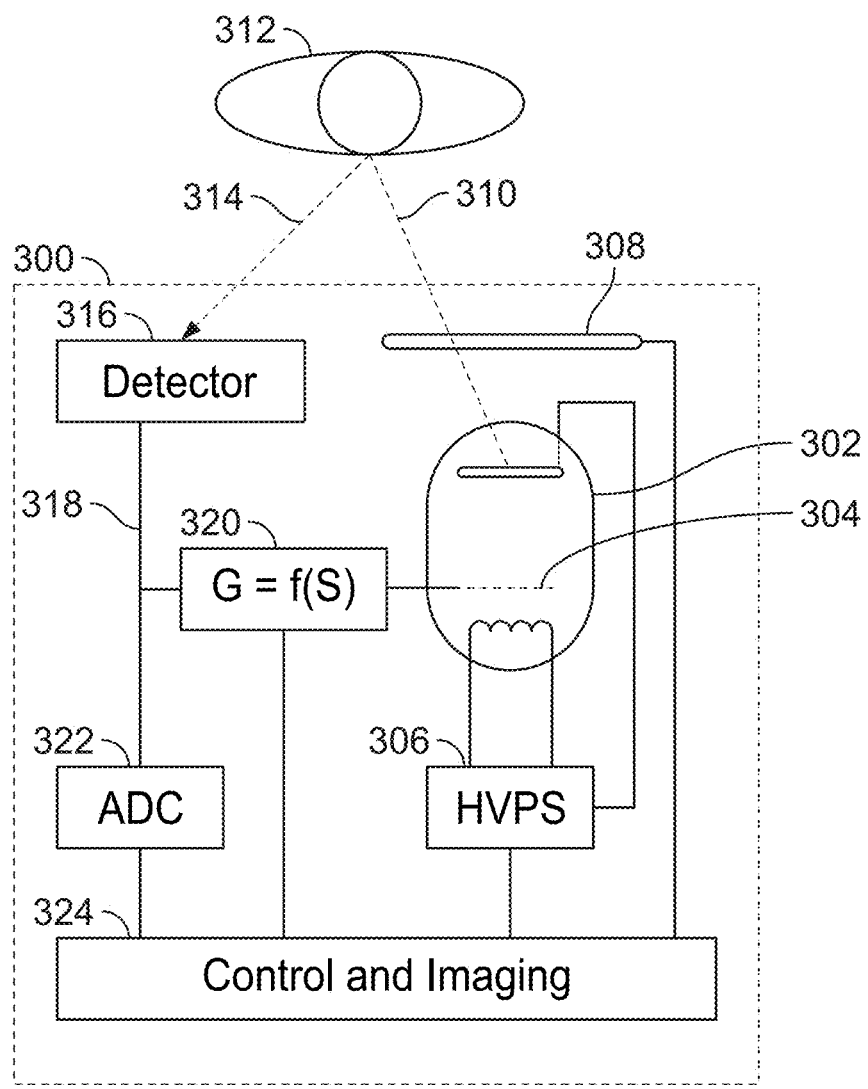
FIG. 3 is a block diagram of an exemplary X-ray backscatter imaging system in accordance with some embodiments of the present specification.

FIG. 3 illustrates an exemplary X-ray backscatter imaging system 300 in accordance with some embodiments of the present specification. System 300 includes an X-ray tube 302 powered by a high voltage power source (HVPS) 306, and a beam former 308 to generate a scanning X-ray pencil beam 310. In embodiments, the X-ray tube 302 is a grid-controlled X-ray tube, which operates in a voltage ranging between 50 and 500 kV. System 300 further includes at least one detector 316 for detection of scatter radiation 314 from a target object 312 under inspection. An analog to digital converter 322 converts an analog detector signal 'S' 318 to digital image data which are used by a control and imaging system 324 to generate a scatter image for display and further analysis.

X-ray tube 302 comprises, in embodiments, a control grid 304 for modulating the tube current and thus the X-ray beam intensity for transmission towards the target object 312. Grid controlled X-ray tubes are well known in the industry and are commercially available. The grid voltage is provided by a grid controller 320. Grid controller 320 generates a grid voltage 'G' as a monotonic function of the analog signal S 318 from detector 316. Accordingly, the analog signal S 318 constitutes an analog feedback which may be used to modulate an amount of the grid voltage G. For the smallest detector signals, the grid voltage will be zero which enables the full output of the X-ray tube resulting in an X-ray beam of maximum intensity. As the detector signal increases, grid controller 320 generates an increasingly negative grid voltage which reduces the X-ray beam intensity. The feedback function implemented through the grid controller 320, which is adapted to reduce the beam intensity as the detector signal increases, establishes a negative feedback loop. The grid controller 320 and the specific form of the feedback function are designed to provide stability and sufficient bandwidth to the imaging system. The design of control systems with feedback is well known in the industry and extensively covered in the literature.

In embodiments the values of the grid control 320 voltage may be recorded together with the detector signal S 318 which enables a more flexible choice of feedback function. In this case, the combination of recorded detector signal S 318 and recorded grid control 320 voltage can be used to generate the inspection image. It shall be noted that a suitably fast feedback control requires a detector response time significantly shorter than the pixel integration time. Commonly used inorganic scintillator detectors such as GOS and BaFCl have scintillation decay times of several microseconds and may be too slow for some applications. However, most organic scintillator detectors have two to three orders of magnitude shorter decay times which will suffice even for fast scanning imaging systems.

Figure 4:
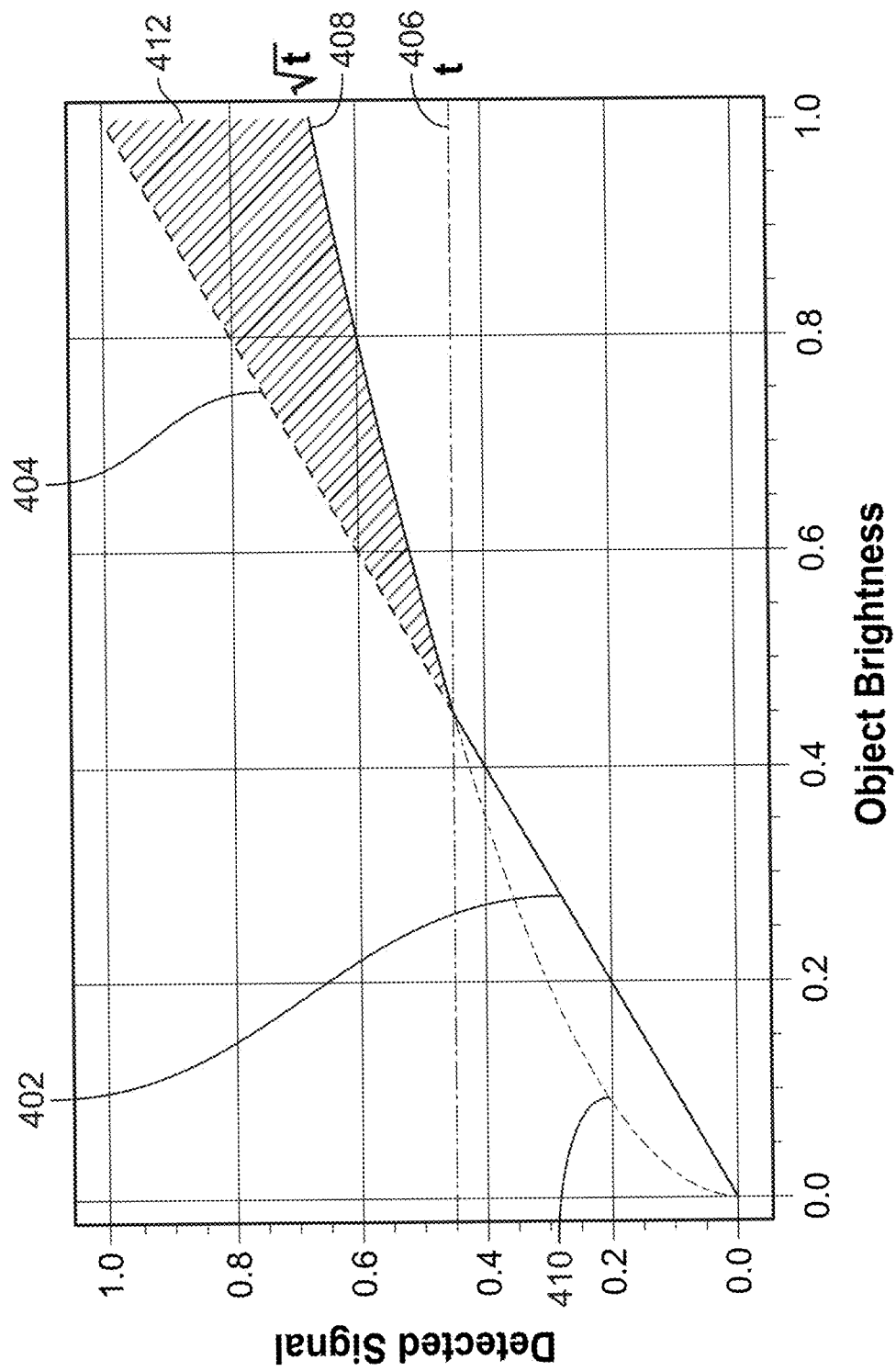
FIG. 4 is a graph illustrating an exemplary signal vs. object brightness correspondence in accordance with an embodiment of the present specification.

FIG. 4 is a graph illustrating one exemplary feedback function, in accordance with the present specification, showing the detected signal (y-axis) as a function of the inherent image brightness (x-axis). In conventional backscatter imaging systems, the detected signal is a linear function of the object brightness with the proportionality factor (slope) depending on the constant X-ray tube current and numerous other system parameters. This behavior is represented by straight lines 402 and 404, which are respectively below and above of a signal threshold value t 406. A preferred relation between brightness and signal would be a square root function as represented by lines 410 and 408, which are respectively below and above of threshold value t 406. However, as line 402 represents the maximum available dose, dashed signal values 410 cannot be generated. Therefore, for signals below a threshold t 406, the maximum available tube current is used. Once the signal reaches threshold t 406, the grid controller starts reducing the tube current so the signal increases less with object brightness than for low signals. Therefore, the slope of line 408 above the threshold is lower than that of line 402 below the threshold. The behavior of line 408 could be linear, a square root as in FIG. 4, or another monotonically increasing form.

Figure 5A:
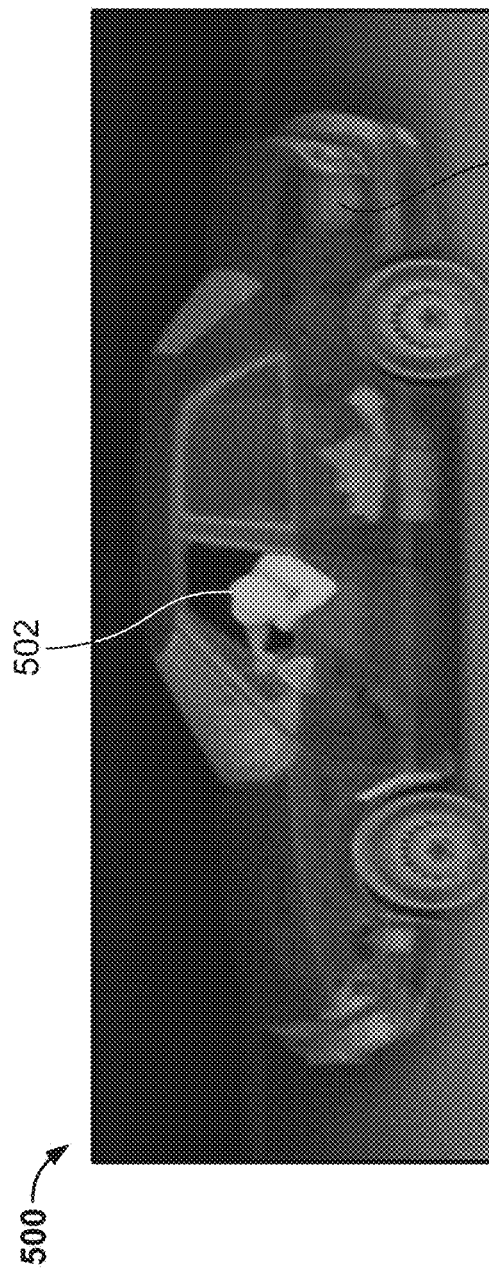
FIG. 5A shows the same image as FIG. 1A, however, with the signal vs. object brightness correspondence of FIG. 4 applied by simulation.
Figure 5B:
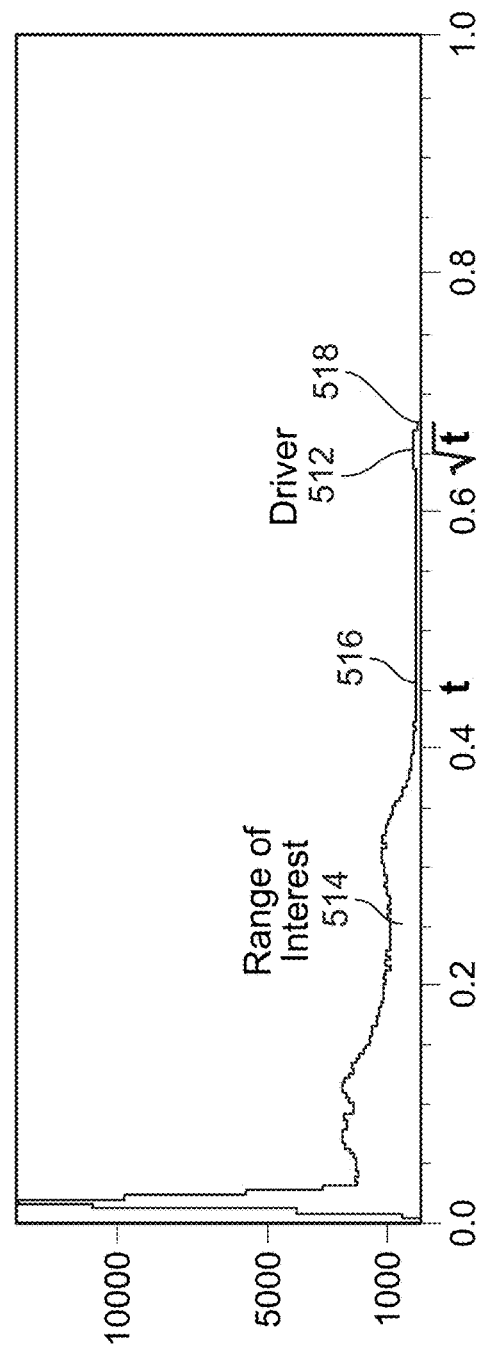
FIG. 5B shows the histogram of gray-values for each pixel in FIG. 5A.

FIG. 5A shows the same image as FIG. 1A but with the signal vs. object brightness correspondence of FIG. 4 applied by simulation. In FIG. 5A the reduced beam intensity produces a lower signal above the threshold 406 which is manifested by the darker rendering of the driver 502. The image areas darker than threshold t 406 (516) are rendered identically to FIG. 1A, which is confirmed by comparing the histograms of FIGS. 1B and 5B. FIG. 5B is a histogram that is a graphical representation of tonal (or gray-value) distribution in the X-ray image of FIG. 5A. The image regions, such as region 514 corresponds to the gray-value 'Range of Interest' in the image of FIG. 5A. Region 512 shows the tonal (or gray-value) distribution in the X-ray image of the driver. A point 516 on the x-axis shows the signal threshold value t. Once the signal reaches threshold t 516, the grid controller starts reducing the tube current so the signal increases less with object brightness than for low signals. A region or area 512, on the x-axis shows the detected signal (y-axis) as a function (square root) of the inherent image brightness (x-axis). Referring to FIG. 4, maximum available tube current is used for signals below point 516, which includes the region of interest 514 (which, in an embodiment, points to approximately 0.25).

Figure 6A:
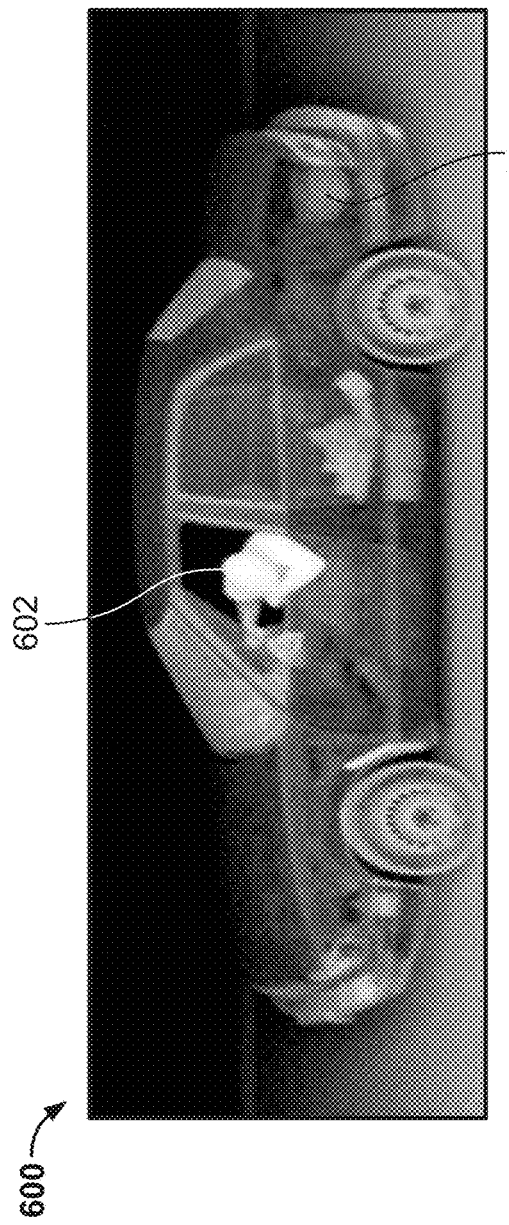
FIG. 6A shows the same image as FIG. 1A, however with the signal vs. object brightness correspondence of FIG. 4 applied by simulation, the gray values rescaled to the full range, and a square-root-filter applied.
Figure 6B:
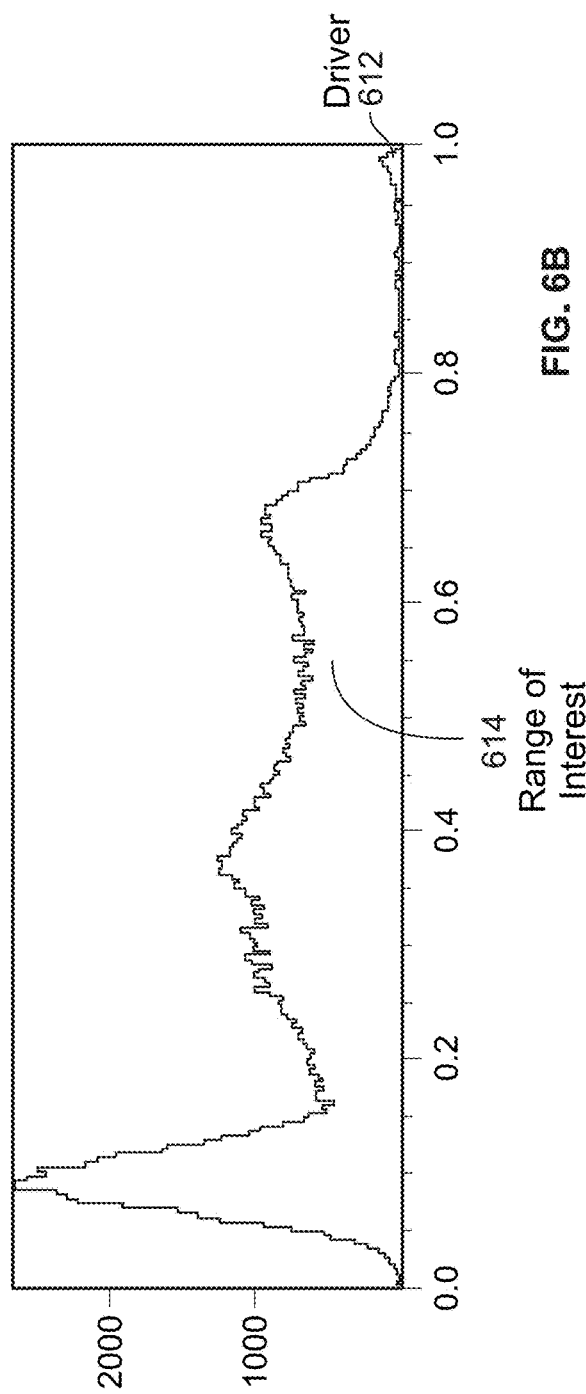
FIG. 6B shows the histogram of gray-values for each pixel in FIG. 6A.

In FIG. 6A, first the dynamic range of the image in FIG. 5A has been restored by dividing each gray-value by the square-root of the threshold 406 and, second, a square-root-filter has been applied. Therefore, FIG. 6A represents an image equivalent to FIG. 2A, but with the signal vs. object brightness correspondence of FIG. 4 applied by simulation. Comparing the image histograms of FIG. 6B to FIG. 2B, it can be observed that the gray-value or tonal range of interest 614 (which, in an embodiment, points to approximately 0.55) below the threshold has been expanded while the gray-value range 612 above the threshold has been compressed.

Again, the feedback function illustrated by FIGS. 4 through 6B is only one exemplary embodiment. In another embodiment the feedback loop could be chosen to keep the detector signal above the threshold constant. In this case the grid voltage needs to be recorded as it now contains all the object brightness information. In embodiments, the process of controlling and/or adjusting the X-ray beam intensity is continuous as the X-ray beam moves from one area over the target object 312 to another.

Figure 7:
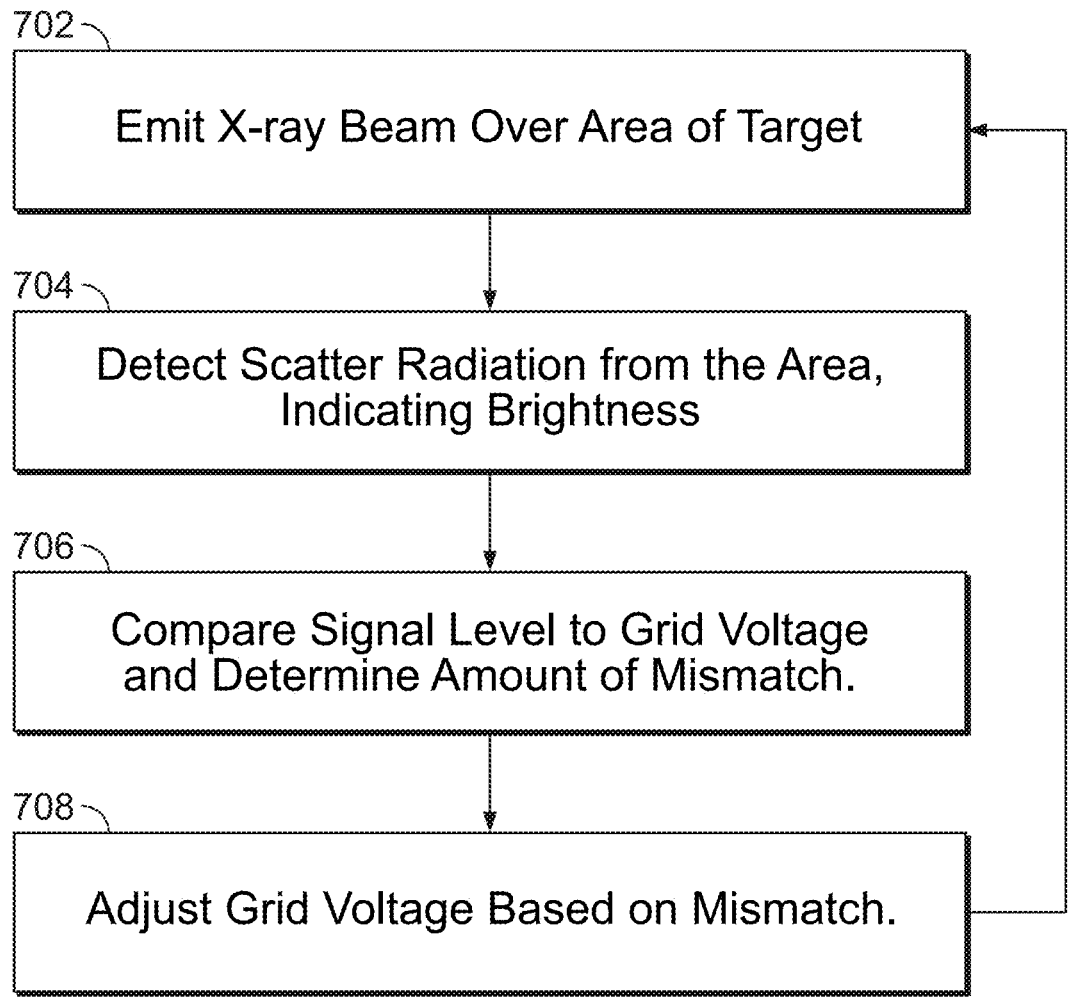
FIG. 7 is a flow chart illustrating an exemplary process of scatter X-ray radiation scanning, in accordance with the embodiments of the present specification.

FIG. 7 is a flow chart illustrating an exemplary process of scatter X-ray radiation scanning, in accordance with the embodiments of the present specification. At step 702, an X-ray beam is emitted over an area of a target object for scanning the target object. In embodiments, the X-ray beam is generated by a grid-controlled X-ray tube, operating in a voltage range of 50 kV to 500 kV. The control grid is responsible for modulating beam current and thus the X-ray beam intensity for transmission towards the target object. At step 704, scatter radiation produced from the area of the target object is detected to generate a detected signal. The detected signal is indicative of brightness of the area of the target object. At step 706, the detected signal is compared to the signal level corresponding to the currently active grid voltage and the amount of mismatch determined. At step 708, the grid voltage is adjusted based on the determined signal mismatch which will adjust the intensity of the X-ray beam to correspond to the current brightness of the target object. The adjusted grid voltage is then used to correspondingly modulate the beam current, which in turn is used to emit X-ray beam over the target area. Therefore, the process repeats itself enabling a continuous monitoring of the detected signal and adjusting of the beam current. In some embodiments, an initial X-ray beam current generated by the system in accordance with embodiments of the present specification, may correspond to the maximum operating voltage of the X-ray tube. The beam current is then immediately adjusted to reflect the target object image's brightness. In embodiments, the X-ray beam intensity is continuously adjusted as the X-ray beam moves from one scanned area in the target object to another scanned area. In embodiments, the X-ray beam intensity is adjusted while the X-ray source is operating and without having to wait until the X-ray source is turned off. The intensity of the scanning X-ray beam is preferably adjustable within the pixel integration time.

For the smallest detector signals the grid voltage will be zero which enables the full output of the X-ray tube resulting in an X-ray beam of maximum intensity. As the detector signal increases, the grid controller generates an increasingly negative grid voltage which reduces the X-ray beam intensity. The feedback function implemented through the grid controller, which acts to reduce the beam intensity as the detector signal increases, establishes a negative feedback loop. It shall be noted that a suitably fast feedback control requires a detector response time significantly shorter than the pixel integration time.

In embodiments, improved image quality and detection performance is realized to increase the low SNR of the darker areas by increasing the areal dose of X-ray beam in those areas. Concurrently, while scanning people it is ensured that the acceptable dose limits are not exceeded by decreasing the areal dose of X-ray beam in the bright areas.

The above examples are merely illustrative of the many applications of the systems and methods of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. An X-ray scanning system adapted to generate and detect a scatter signal, the X-ray scanning system comprising:
   an X-ray source configured to emit an X-ray beam, having an X-ray beam intensity, towards an area over a target object for scanning the target object;
   at least one detector adapted to detect radiation scattered from the target object and generate a corresponding scatter radiation signal, wherein the scatter radiation signal is characterized, at least in part, by one or more brightness levels corresponding to one or more scanned areas of the target object; and
   a feedback controller, wherein the feedback controller is configured to receive the scatter radiation signal from the at least one detector, generate a control signal that is a function of the one or more brightness levels and that is based on the received scatter radiation signal, and transmit the control signal to the X-ray source and wherein the X-ray source is configured to receive the control signal and adjust the X-ray beam intensity based on the control signal.

2. The X-ray scanning system of claim 1, wherein the X-ray source is an X-ray tube comprising a control grid.

3. The X-ray scanning system of claim 2, wherein the feedback controller is configured to compare a voltage of the control grid to the scatter radiation signal.

4. The X-ray scanning system of claim 1, wherein the feedback controller receives the scatter radiation signal in analog form.

5. The X-ray scanning system of claim 1, wherein the feedback controller receives the scatter radiation signal from the at least one detector prior to the scatter radiation signal being processed by an analog to digital converter.

6. The X-ray scanning system of claim 1, wherein the X-ray source is configured to operate with tube voltages between 50 kV and 500 kV.

7. The X-ray scanning system of claim 1, wherein the control signal generated by the feedback controller is adapted to cause the X-ray source to reduce the X-ray beam intensity as the scatter radiation signal increases and increase the X-ray beam intensity as the scatter radiation signal decreases.

8. The X-ray scanning system of claim 1, wherein the at least one detector comprises an organic scintillator detector.

9. The X-ray scanning system of claim 1, wherein the feedback controller is configured to continuously adjust the X-ray beam intensity as the X-ray beam moves from one of the one or more scanned areas to another of the one or more scanned areas.

10. The X-ray scanning system of claim 1, wherein the X-ray source is configured to adjust the X-ray beam intensity based on the detector signal while the X-ray source is operating and without having to wait until the X-ray source is turned off.

11. The X-ray scanning system of claim 1, wherein a response time of the at least one detector is shorter than a pixel integration time for generating a detected image.

12. An X-ray scanning method for generating and detecting a backscatter signal, the method comprising:
    using an X-ray source, emitting an X-ray beam, having an X-ray beam intensity, toward an area of a target object for scanning the target object;
    using at least one detector, detecting backscatter radiation from the area of the target object and generating a corresponding backscatter signal, wherein the backscatter signal is characterized, at least in part, by one or more brightness levels corresponding to one or more scanned areas of the target object;
    using a feedback controller, receiving the backscatter radiation signal from the at least one detector, generating a control signal that is a function of the one or more brightness levels and that is based on the received backscatter signal, and transmitting the control signal to the X-ray source, wherein the X-ray source is configured to receive the control signal and adjust the X-ray beam intensity based on the control signal.

13. The X-ray scanning method of claim 12, further comprising determining an intensity level required to improve an image quality of an image produced from the backscatter signal.

14. The X-ray scanning method of claim 12, further comprising determining an intensity level required to reduce an intensity level for the one or more brightness levels above a threshold level.

15. The X-ray scanning method of claim 12, further comprising determining an intensity level required to increase an intensity level for the one or more brightness levels below a threshold level.

16. The X-ray scanning method of claim 12, wherein the feedback controller is configured to compare a voltage of a control grid of the X-ray source to the backscatter signal.

17. The X-ray scanning method of claim 12, wherein the X-ray source is configured to operate with tube voltages between 50 kV and 500 kV.

18. The X-ray scanning method of claim 12, wherein the at least one detector is an organic scintillator detector.

19. The X-ray scanning method of claim 12, wherein the feedback controller receives the backscatter signal in analog form.

20. The X-ray scanning method of claim 12, wherein the feedback controller receives the backscatter signal from the at least one detector prior to the backscatter signal being processed by an analog to digital converter.

21. The X-ray scanning method of claim 12, wherein a response time of the at least one detector is shorter than a pixel integration time for generating a detected image from the backscatter signal.

22. The X-ray scanning method of claim 12, wherein the signal generated by the feedback controller is adapted to cause the X-ray source to reduce the X-ray beam intensity as the backscatter signal increases and increase the X-ray beam intensity as the backscatter signal decreases.

23. The X-ray scanning method of claim 12, wherein the feedback controller is configured to continuously adjust the X-ray beam intensity as the X-ray beam moves from one of the one or more scanned areas to another of the one or more scanned areas.

24. The X-ray scanning method of claim 12, wherein the X-ray source is configured to adjust the X-ray beam intensity based on the signal while the X-ray source is operating and without having to wait until the X-ray source is turned off.

25. The X-ray scanning method of claim 12, wherein the X-ray source is configured to adjust the X-ray beam intensity based on the signal while the X-ray beam moves from one of the one or more scanned areas to another of the one or more scanned areas without having to wait until the X-ray source is turned off or without having to wait until another target object is being scanned.

\* \* \* \* \*